United States Patent
Lee et al.

(10) Patent No.: US 10,923,961 B2
(45) Date of Patent: *Feb. 16, 2021

(54) WIRELESS POWER TRANSMITTING UNIT, WIRELESS POWER RECEIVING UNIT, AND CONTROL METHODS THEREOF

(71) Applicant: Samsung Electronics Co., Ltd., Gyeonggi-do (KR)

(72) Inventors: Kyung-Woo Lee, Seoul (KR); Hyuk-Choon Kwon, Seoul (KR); Kang-Ho Byun, Gyeonggi-do (KR); Hee-Won Jung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/596,220

(22) Filed: Oct. 8, 2019

(65) Prior Publication Data

US 2020/0044490 A1  Feb. 6, 2020

Related U.S. Application Data

(63) Continuation of application No. 16/038,843, filed on Jul. 18, 2018, now Pat. No. 10,454,318, which is a (Continued)

(30) Foreign Application Priority Data

Mar. 21, 2013 (KR) .................... 10-2013-0030568
Dec. 13, 2013 (KR) .................... 10-2013-0155925

(51) Int. Cl.
*H02J 50/40* (2016.01)
*H02J 50/80* (2016.01)
(Continued)

(52) U.S. Cl.
CPC .............. *H02J 50/40* (2016.02); *H02J 7/025* (2013.01); *H02J 50/12* (2016.02); *H02J 50/80* (2016.02)

(58) Field of Classification Search
CPC .. H02J 50/40; H02J 7/025; H02J 50/12; H02J 50/80
(Continued)

(56) References Cited

U.S. PATENT DOCUMENTS 6,427,074 B1  7/2002  Chavez, Jr. et al.
8,598,747 B2  12/2013  Bilbrey
(Continued)

FOREIGN PATENT DOCUMENTS

CN  102812618  12/2012
EP  2 568 572  3/2013
(Continued)

OTHER PUBLICATIONS

Chinese Office Action dated Nov. 23, 2017 issued in counterpart application No. 201480017207.8, 12 pages.
(Continued)

*Primary Examiner* — Sun J Lin
(74) *Attorney, Agent, or Firm* — The Farrell Law Firm, P.C.

(57) ABSTRACT

A control method of a wireless power receiver is provided. The control method includes wirelessly receiving a first power from a wireless power transmitter; based on the received first power, loading a first communication stack from a memory stored in a communication module of the wireless power receiver; establishing a communication connection with the wireless power transmitter based on the first communication stack; wirelessly receiving a second power from the wireless power transmitter; based on residual capacity of a battery of the wireless power receiver exceed- (Continued)

ing a minimum power threshold according to the received second power, determining to re-initialize the communication connection with the wireless power transmitter; transmitting a message including a time period required to complete at least one procedure for re-initializing the communication connection with the wireless power transmitter; and wirelessly receiving the second power from the wireless power transmitter while re-initializing the communication connection with the wireless power transmitter.

28 Claims, 14 Drawing Sheets

Related U.S. Application Data continuation of application No. 15/370,671, filed on Dec. 6, 2016, now Pat. No. 10,038,344, which is a continuation of application No. 14/221,530, filed on Mar. 21, 2014, now Pat. No. 9,515,514.

(51) Int. Cl.
 *H02J 50/12* (2016.01)
 *H02J 7/02* (2016.01)

(58) Field of Classification Search
 USPC .......................................................... 320/108
 See application file for complete search history.

(56) References Cited

U.S. PATENT DOCUMENTS

| | | |
|---|---|---|
| 9,509,151 B2 | 11/2016 | Lee et al. |
| 9,515,514 B2 | 12/2016 | Lee et al. |
| 9,853,692 B1 | 12/2017 | Bell et al. |
| 10,038,344 B2 | 7/2018 | Lee et al. |
| 10,454,318 B2 * | 10/2019 | Lee et al. ................. H02J 7/025 |
| 2009/0284082 A1 | 11/2009 | Mohammadian |
| 2010/0026236 A1 | 2/2010 | Kamiyama et al. |
| 2010/0213895 A1 | 8/2010 | Keating et al. |
| 2011/0221389 A1 | 9/2011 | Won et al. |
| 2012/0212070 A1 | 8/2012 | Tanabe |
| 2013/0047008 A1 | 2/2013 | Shin |
| 2013/0057078 A1 | 3/2013 | Lee et al. |
| 2013/0062959 A1 | 3/2013 | Lee et al. |
| 2013/0062961 A1 | 3/2013 | Park |
| 2013/0063082 A1 | 3/2013 | Lee et al. |
| 2013/0099734 A1 | 4/2013 | Lee et al. |
| 2013/0234661 A1 | 9/2013 | Yang et al. |
| 2013/0264997 A1 | 10/2013 | Lee et al. |
| 2016/0013678 A1 | 1/2016 | Bell et al. |

FOREIGN PATENT DOCUMENTS

| | | |
|---|---|---|
| KR | 1020110009227 | 1/2011 |
| KR | 1020110103296 | 9/2011 |
| KR | 1020120068412 | 6/2012 |
| KR | 1020130114473 | 10/2013 |
| WO | WO 2012/081858 | 6/2012 |
| WO | WO 2013/015206 | 1/2013 |

OTHER PUBLICATIONS

European Search Report dated Jan. 16, 2018 issued in counterpart application No. 17191444.3-1202, 7 pages.
Chinese Office Action dated Mar. 8, 2017 issued in counterpart application No. 201480017207.8, 13 pages.
Korean Office Action dated Mar. 6, 2019 issued in counterpart application No. 10-2013-0050317, 9 pages.
Korean Office Action dated Aug. 2, 2018 issued in counterpart application No. 10-2013-0155925, 6 pages.

* cited by examiner

WIRELESS POWER TRANSMITTING UNIT, WIRELESS POWER RECEIVING UNIT, AND CONTROL METHODS THEREOF

PRIORITY

This application is a continuation of and claims priority under 35 U.S.C. § 120 to U.S. patent application Ser. No. 16/038,843, filed on Jul. 18, 2018, which is a continuation of and claims priority under 35 U.S.C. § 120 to U.S. patent application Ser. No. 15/370,671, filed on Dec. 6, 2016, issued as U.S. Pat. No. 10,038,344 on Jul. 31, 2018, which is a continuation of and claims priority under 35 U.S.C. § 120 to U.S. patent application Ser. No. 14/221,530, filed on Mar. 21, 2014, issued as U.S. Pat. No. 9,515,514 on Dec. 6, 2016, and claims priority under 35 U.S.C. § 119(a) to Korean Pat. App. Ser. Nos. 10-2013-0030568 and 10-2013-0155925, which were filed in the Korean Intellectual Property Office on Mar. 21, 2013 and Dec. 13, 2013, respectively; the entire content of all of the above is incorporated herein by reference.

BACKGROUND

1. Field of the Invention

The present invention generally relates to a wireless power transmitting unit, a wireless power receiving unit, and control methods thereof, and more particularly, to a wireless power transmitting unit, a wireless power receiving unit, and control methods thereof, which can wirelessly transmit/receive charging power.

2. Description of the Related Art

Wireless charging or non-contact charging technologies have been developed to be currently used for many electronic devices. Such a wireless charging technology employs wireless power transmission/reception, and corresponds to, for example, a system in which a battery can be automatically charged if the battery is placed on a charging pad, without the need for connecting the electronic device to a separate charging connector. The wireless charging technology can increase a waterproof function through wirelessly charging electronic products and increase portability of the electronic device because there is no need for a wired charger.

Among the wireless charging technologies, charging using a resonance scheme is performed as follows. When a wireless power receiving unit (for example, a portable terminal) requiring charging is located on a wireless power transmitting unit (for example, a charging pad) transmitting wireless power, the wireless power transmitting unit may charge the wireless power receiving unit. When a plurality of wireless power receiving units are located on a charging area of one wireless power transmitting unit, power required by each of the wireless power receiving units may be different from the transmitted power, so that efficient charging can be made for each of the wireless power receiving units.

While research on a wireless charging method is currently progressing, standards for a wireless charging order, a search for a wireless power transmitting unit/receiving unit, selection of a communication frequency between the wireless power transmitting unit/receiving unit, a wireless power control, selection of a matching circuit, and communication time distribution to each wireless power receiving unit in one charging cycle have not yet been proposed. Specifically, there is a need for a technology which can deal with a situation where the wireless power receiving unit detects a charging environment change by notifying the wireless power transmitting unit of the detected environment change.

SUMMARY

The present invention has been made to address at least the above problems and disadvantages, and to provide at least the advantages described below.

Accordingly, an aspect of the present invention provides a wireless power transmitting unit, a wireless power receiving unit, and control methods thereof, which wireless transmit and receive charging power.

In accordance with an aspect of the present invention, a control method is provided for a wireless power receiver. The control method includes wirelessly receiving a first power from a wireless power transmitter; based on the received first power, loading a first communication stack from a memory stored in a communication module of the wireless power receiver; establishing a communication connection with the wireless power transmitter based on the first communication stack; wirelessly receiving a second power from the wireless power transmitter; based on a residual capacity of a battery of the wireless power receiver exceeding a minimum power threshold according to the received second power, determining to re-initialize the communication connection with the wireless power transmitter; based on determining to re-initialize the communication connection with the wireless power transmitter, transmitting a message including a time period required to complete at least one procedure for re-initializing the communication connection with the wireless power transmitter; and wirelessly receiving the second power from the wireless power transmitter while re-initializing the communication connection with the wireless power transmitter.

In accordance with another aspect of the present invention, a wireless power receiver is provided, which includes a communication module; and a power receiving resonator. The communication module is configured to load a first communication stack from a memory stored in the communication module of the wireless power receiver based on a first power received through the power receiving resonator, establish a communication connection with the wireless power transmitter based on the first communication stack, based on the first power received through the power receiving resonator, wherein a second power is received through the power receiving resonator after establishing the communication connection, based on a residual capacity of a battery of the wireless power receiver exceeding a minimum power threshold according to the received second power, determine to re-initialize the communication connection with the wireless power transmitter, and based on determining to re-initialize the communication connection with the wireless power transmitter, transmit a message including a time period required to complete at least one procedure for re-initializing the communication connection with the wireless power transmitter. The power receiving resonator wirelessly receives the second power from the wireless power transmitter while re-initializing the communication connection with the wireless power transmitter.

In accordance with another aspect of the present invention, a control method is provided for a wireless power transmitter. The control method includes wirelessly transmitting a first power to a wireless power receiver; establishing a communication connection with the wireless power receiver; wirelessly transmitting a second power to the wireless power receiver; receiving a message including a time period required to complete at least one procedure for re-initializing the communication connection with the wireless power receiver; and wirelessly transmitting the second power to the wireless power receiver while the wireless power receiver re-initializes the communication connection with the wireless power transmitter.

In accordance with another aspect of the present invention, a wireless power transmitter is provided, which includes a communication module; a power transmitting resonator; and a controller. The controller is configured to control the wireless power transmitter to wirelessly transmit a first power to a wireless power receiver through the power transmitting resonator, establish, by using the communication module, a communication connection with the wireless power receiver, wherein the power transmitting resonator transmits the second power to the wireless power receiver after establishing the communication connection, receiving, by using the communication module, a message including a time period required to complete at least one procedure for re-initializing the communication connection with the wireless power receiver, and control the wireless power transmitter to wirelessly transmit a second power to the wireless power receiver while the wireless power receiver re-initializes the communication connection with the wireless power transmitter.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
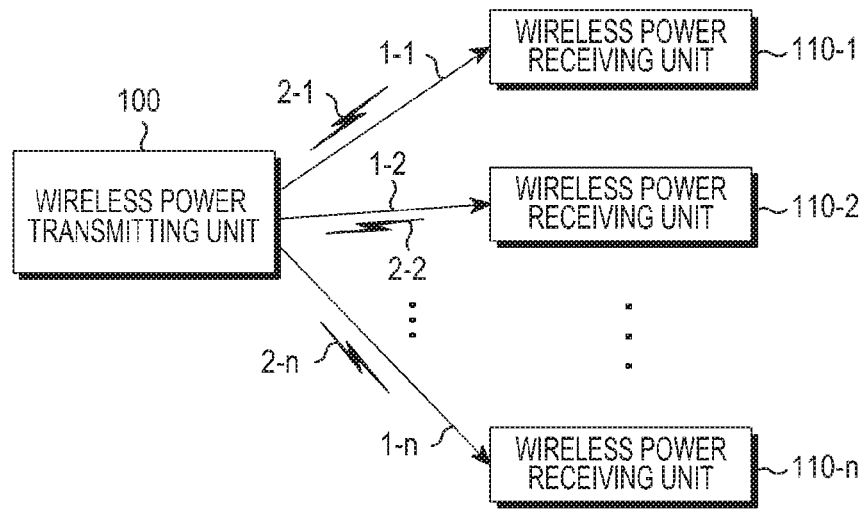
FIG. 1 is a block diagram which illustrates a wireless charging system.

Hereinafter, various embodiments of the present invention will be described more specifically with reference to the accompanying drawings. It should be noted that the same components of the drawings are designated by the same reference numeral throughout the figures. In the following description of the present invention, a detailed description of known functions and configurations incorporated herein will be omitted when it may make the subject matter of the present disclosure unclear.

According to at least one embodiment of the present invention, a wireless power transmitting unit supplying wireless power and a wireless power receiving unit receiving the wireless power to perform charging perform communication with each other for controlling wireless power transmission by using non-contact short-range wireless communication. In a dead battery state in which power sufficient to turn on an Application Processor (hereinafter referred to as an AP) cannot be supplied, wireless charging can be performed using only some components for the wireless charging within the wireless power receiving unit. For example, it is possible to perform wireless charging by using a non-contact short-range wireless communication module basically embedded in a wireless power receiving unit without a separate communication module for performing the wireless charging. Thereafter, when the AP is driven as a battery is charged, the wireless charging can be performed by loading a stack from the AP. At this time, as the AP is driven, a predetermined time is spent until a mode transition is completed.

In an embodiment of the present invention, the wireless power transmitting unit is informed of the mode transition and thus can stand by for a time spent when the mode transition is completed. According to the mode transition, the wireless power transmitting unit recognizes a mode transition condition in the wireless power receiving unit to maintain a connection with the wireless power receiving unit even though the wireless power transmitting unit does not receive a response from the wireless power receiving unit for a predetermined time.

In an embodiment of the present invention, a BlueTooth (BT) scheme or a Bluetooth Low Energy (BLE) scheme may be used as an example of a low energy wireless communication scheme of the non-contact short-range wireless communication scheme. The low energy wireless communication scheme consuming a minimum of power may include other short-range wireless communication schemes such as Zigbee communication, wireless IrDA, and the like, as well as the aforementioned schemes. Further, a non-contact short-range wireless communication unit may be configured by one chip which can support a wireless network scheme as well as the low energy wireless communication scheme. Accordingly, a WiFi scheme is used as an example of the wireless network scheme.

Further, a wireless charging method according to an embodiment of the present invention can be applied to any device which receives wireless power to perform charging through electronic device wireless charging, an electric car wireless power supply, a long-distance wireless power supply, a ubiquitous wireless sensor power supply, and the like. In addition, wireless charging is performed using a non-contact short-range wireless communication module basically embedded in the wireless power receiving unit without a separate communication module for the wireless charging, so that the separate communication module for the wireless charging is not needed. As a result, manufacturing costs can be reduced.

FIG. 1 illustrates a wireless charging system. As shown in FIG. 1, the wireless charging system includes a wireless power transmitting unit 100 and one or more wireless power receiving units 110-1, 110-2, . . . , and 110-n.

The wireless power transmitting unit 100 wirelessly transmits power 1-1, 1-2, . . . , and 1-n to the one or more wireless power receiving units 110-1, 110-2, . . . , and 110-n, respectively. The wireless power transmitting unit 100 may wirelessly transmit the power 1-1, 1-2, . . . , and 1-n only to the wireless power receiving units authorized through a preset authentication process.

The wireless power transmitting unit 100 forms wireless connections with the wireless power receiving units 110-1, 110-2, . . . , and 110-n. For example, the wireless power transmitting unit 100 transmits wireless power to the wireless power receiving units 110-1, 110-2, . . . , and 110-n through electromagnetic waves.

The one or more wireless power receiving units 110-1, 110-2, . . . , and 110-n wirelessly receive power from the wireless power transmitting unit 100 to charge batteries inside the wireless power receiving units 110-1, 110-2, . . . , and 110-n. Further, the one or more wireless power receiving units 110-1, 110-2, . . . , and 110-n may transmit messages 2-1, 2-2, . . . , and 2-n including a request of wireless power transmission, information required for reception of wireless power, state information of the wireless power receiving units 110-1, 110-2, . . . , and 110-n and information (that is, control information) for controlling the wireless power transmitting unit 100 to the wireless power transmitting unit 100. Similarly, the wireless power transmitting unit 100 may transmit a message including state information of the wireless power transmitting unit 100 and information (that is, control information) for controlling the wireless power receiving units 110-1, 110-2, . . . , and 110-n to the wireless power receiving units 110-1, 110-2, . . . , and 110-n.

Further, each of the wireless power receiving units 110-1, 110-2, . . . , and 110-n may transmit a message indicating a charging state to the wireless power transmitting unit 100.

The wireless power transmitting unit 100 includes a display unit such as a display, and displays a state of each of the wireless power receiving units 110-1, 110-2, and 110-n based on the message received from each of the wireless power receiving units 110-1, 110-2, . . . , and 110-n. Further, the wireless power transmitting unit 100 may also display a time expected to be spent until each of the wireless power receiving units 110-1, 110-2, . . . , and 110-n is completely charged.

The wireless power transmitting unit 100 transmits a control signal (or control message) for disabling a wireless charging function of each of the one or more wireless power receiving units 110-1, 110-2, . . . , and 110-n. The wireless power receiving units having received the disable control signal of the wireless charging function from the wireless power transmitting unit 100 disable the wireless charging function.

Figure 2:
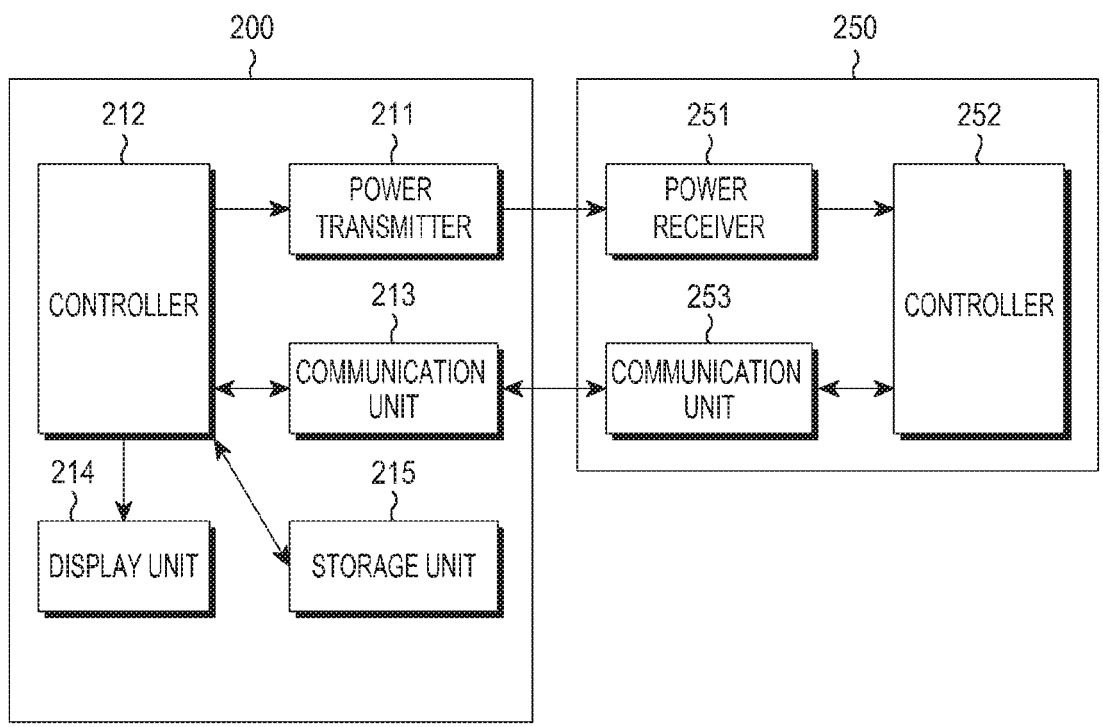
FIG. 2 is a block diagram which illustrates a wireless power transmitting unit and a wireless power receiving unit according to an embodiment of the present invention.

FIG. 2 illustrates a wireless power transmitting unit and a wireless power receiving unit according to an embodiment of the present invention.

As illustrated in FIG. 2, the wireless power transmitting unit 200 includes at least a power transmitter 211, a controller 212, a communication unit 213 and may also include, a display unit 214, and a storage unit 215. Further, the wireless power receiving unit 250 includes a power receiver 251, a controller 252, and a communication unit 253.

The power transmitter 211 supplies power which is required by the wireless power transmitting unit 200, and wirelessly provides power to the wireless power receiving unit 250. The power transmitter 211 may supply power in an Alternating Current (AC) waveform type, or convert power in a Direct Current (DC) waveform type to the power in the AC waveform type by using an inverter, and then supply the power in the AC waveform type. The power transmitter 211 may be implemented in a form of an embedded battery or in a form of a power receiving interface so as to receive the power from outside thereof and supply the power to the other components. It will be easily understood by those skilled in the art that the power transmitter 211 is not limited if it supplies power of constant alternate current waves.

The controller 212 controls overall operations of the wireless power transmitting unit 200. The controller 212 controls overall operations of the wireless power transmitting unit 200 by using an algorithm, a program, or an application which is required for a control and read from the storage unit 215. The controller 212 may be implemented in a form of a CPU, a microprocessor, a mini computer and the like.

The communication unit 213 communicates with the wireless power receiving unit 250 in a specific manner. The communication unit 213 receives power information from the wireless power receiving unit 250. Here, the power information includes at least one of a capacity of the wireless power receiving unit 250, a residual amount of the battery, a number of times of charging, an amount of use, a battery capacity, and a proportion of the remaining battery capacity. Further, the communication unit 213 transmits a signal of controlling a charging function in order to control the charging function of the wireless power receiving unit 250. The signal of controlling the charging function may be a control signal of controlling the power receiver 251 of the wireless power receiving unit 250 so as to enable or disable the charging function. More specifically, the power information may include information on an insertion of a wireless charging terminal, a transition from a Stand Alone (SA) mode to a Non-Stand Alone (NSA) mode, error state release and the like.

The communication unit 213 may receive a signal from another wireless power transmitting unit (not shown) as well as from the wireless power receiving unit 250.

The controller 212 may display a state of the wireless power receiving unit 250 on a display unit 214 based on the message received from the wireless power receiving unit 250 through the communication unit 213. Further, the controller 212 may also display a time expected to be spent until the wireless power receiving unit is completely charged on the display unit 214.

Figure 3:
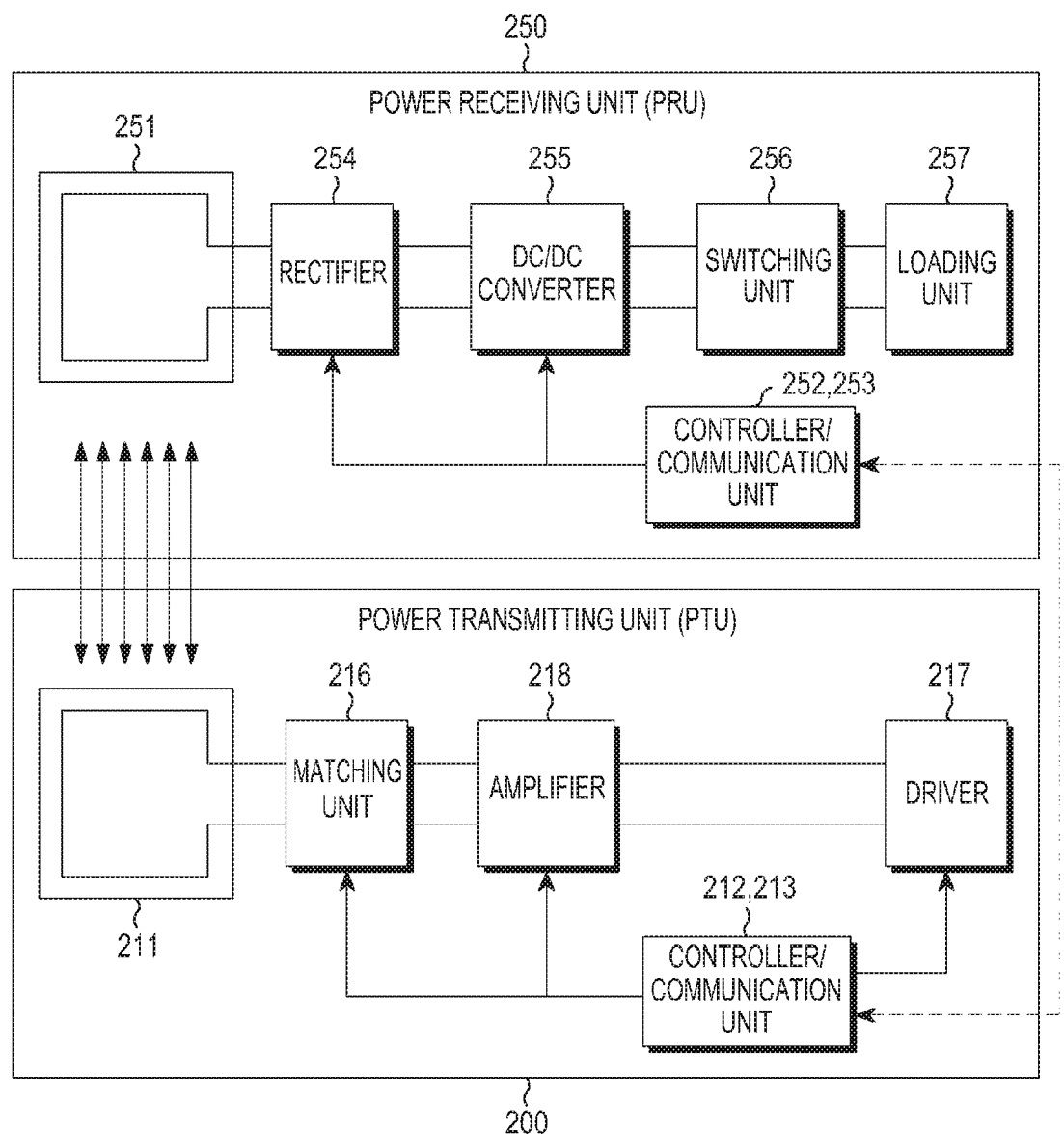
FIG. 3 is a block diagram illustrating in detail a wireless power transmitting unit and a wireless power receiving unit according to an embodiment of the present invention.

FIG. 3 is a block diagram illustrating in detail the wireless power transmitting unit and the wireless power receiving unit according to an embodiment of the present invention.

As illustrated in FIG. 3, the wireless power transmitting unit 200 includes the power transmitter 211, the controller/communication unit (MCU & Out-of-band Signaling) 212/213, a driver (Power Supply) 217, an amplifier (Power Amp) 218, and a matching unit (Matching Circuit) 216. The wireless power receiving unit 250 includes the power receiver 251, the controller/communication unit 252/253, a DC/DC converter 255, a switching unit (Switch) 256, and a loading unit (Client Device Load) 257.

The driver 217 may output DC power having a preset voltage value. The voltage value of the DC power output by the driver 217 may be controlled by the controller/communication unit 212/213.

The DC power output from the driver 217 is output to the amplifier 218, which amplifies the DC power by a preset gain. Further, the amplifier 218 converts DC power to AC power based on a signal input from the controller/communication unit 212/213. Accordingly, the amplifier 218 outputs AC power.

The matching unit 216 performs impedance matching. For example, the matching unit 216 may adjust impedance viewed from the matching unit 216 to control output power to be high efficient or high output power. The matching unit 216 may also adjust impedance based on a control of the controller/communication unit 212/213. The matching unit 216 includes at least one of a coil and a capacitor. The controller/communication unit 212/213 controls a connection state with at least one of the coil and the capacitor, and accordingly, performs impedance matching.

The power transmitter 211 transmits input AC power to the power receiver 251. The power transmitter 211 and the power receiver 251 may be implemented by resonant circuits having the same resonance frequency. For example, the resonance frequency may be determined to be 6.78 MHz.

Meanwhile, the controller/communication unit 212/213 communicates with the controller/communication unit 252/253 of the wireless power receiving unit 250, and perform communication (WiFi, ZigBee, or BT/BLE), for example, with a bi-directional 2.4 GHz frequency.

The power receiver 251 receives charging power.

The rectifying unit 254 rectifies wireless power received by the power receiver 251 in the form of direct current, and is implemented in a form of bridge diode. The DC/DC converter 255 converts the rectified electric current into a predetermined gain. For example, the DC/DC converter 255 converts the rectified electric current so that a voltage of an output end 259 becomes 5V. Meanwhile, a minimum value and a maximum value of the voltage which can be applied may be preset for a front end 258 of the DC/DC converter 255.

The switching unit 256 connects the DC/DC converter 255 to the loading unit 257. The switching unit 256 is held in an on/off state under a control of the controller 252. In a case where the switch 256 is in the on state, the loading unit 257 stores converted electric power which is input from the DC/DC converter 255.

Figure 4:
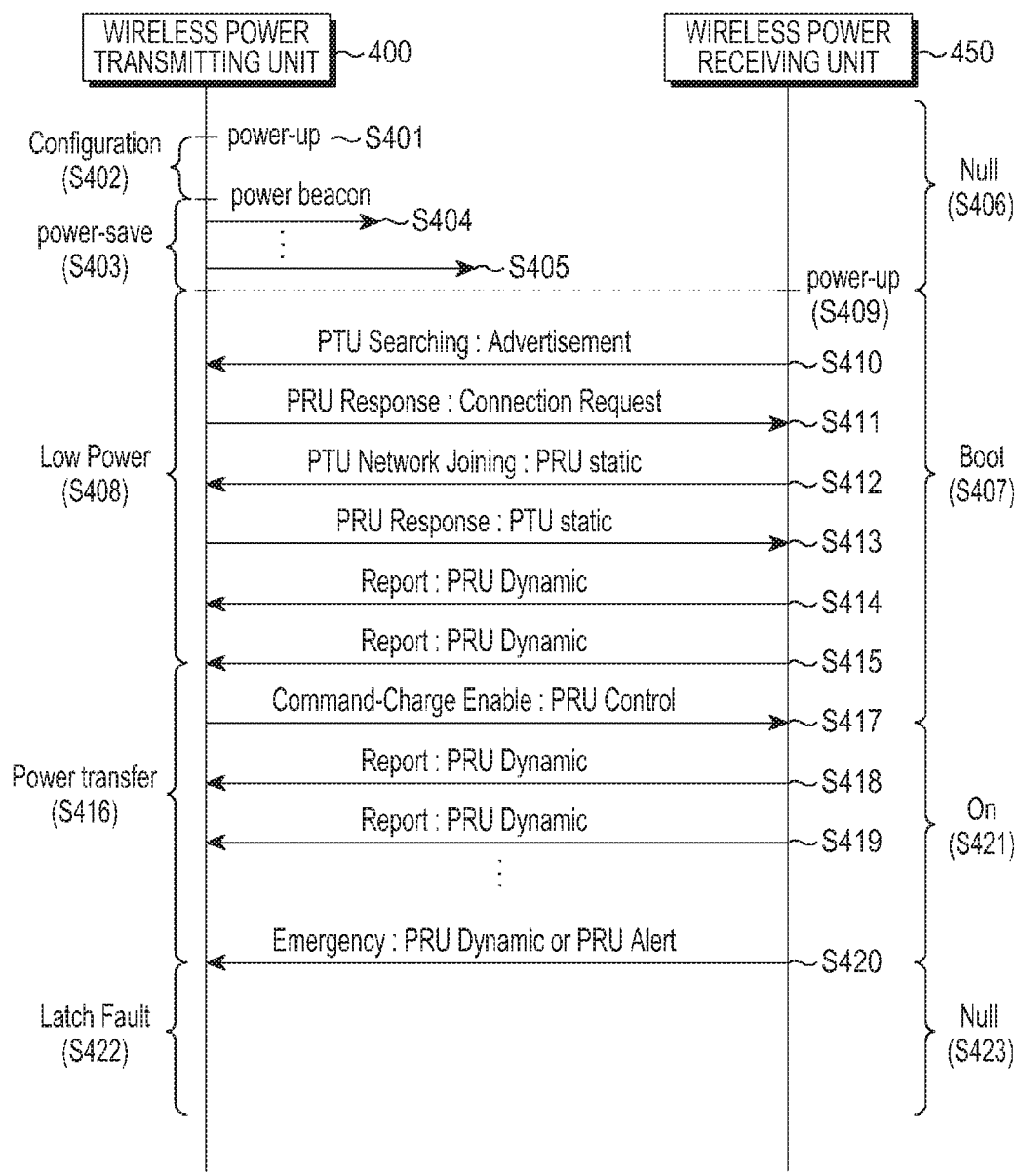
FIG. 4 is a flow diagram illustrating operations of a wireless power transmitting unit and a wireless power receiving unit according to an embodiment of the present invention.

FIG. 4 is a flow diagram illustrating operations of the wireless power transmitting unit and the wireless power receiving unit according to an embodiment of the present invention. As illustrated in FIG. 4, a wireless power transmitting unit 400 applies power in step S401. When the power is applied, the wireless power transmitting unit 400 configures an environment in S402.

The wireless power transmitting unit 400 enters a power saving mode in step S403. In the power saving mode, the wireless power transmitting unit 400 may apply different types of power beacons for detection according to their own periods, which will be described in more detail with reference to FIG. 6. For example, in FIG. 4, the wireless power transmitting unit 400 applies detection power beacons 404 and 405, and the sizes of power values of the detection power beacons 404 and 405 may be different. A part or all of the detection power beacons 404 and 405 may have power enough to drive the communication unit of the wireless power receiving unit 450. For example, the wireless power receiving unit 450 may drive the communication unit by the part or all of the detection power beacons 404 and 405 to communicate with the wireless power transmitting unit 400. The above state may be named a null state in step S406.

The wireless power transmitting unit 400 detects a load change by an arrangement of the wireless power receiving unit 450. The wireless power transmitting unit 400 may enter a low power mode in step S409. The low power mode will be described in more detail with reference to FIG. 6. Meanwhile, the wireless power receiving unit 450 may drive the communication unit based on power received from the wireless power transmitting unit 400 in step S409.

The wireless power receiving unit 450 transmits a Power Transmitting Unit (PTU) searching signal to the wireless power transmitting unit 400 in step S410. The wireless power receiving unit 450 transmits the PTU searching signal as an advertisement signal based on a Bluetooth Low Energy (BLE) scheme. The wireless power receiving unit 450 may transmit the PTU searching signal periodically or until a preset time arrives, and receives a response signal from the wireless power transmitting unit 400.

When receiving the PTU searching signal from the wireless power receiving unit 450, the wireless power transmitting unit 400 transmits a PRU response signal in step S411. The Power Receiving Unit (PRU) response signal forms a connection between the wireless power transmitting unit 400 and the wireless power receiving unit 450. The wireless power receiving unit 450 transmits a PRU static signal in step S412. The PRU static signal may be a signal indicating that the wireless power receiving unit 450 may make a request for joining the wireless power network managed by the wireless power transmitting unit 400.

The wireless power transmitting unit 400 transmits a PTU static signal in step S413. The PTU static signal transmitted by the wireless power transmitting unit 400 may be a signal indicating a capability of the wireless power transmitting unit 400.

When the wireless power transmitting unit 400 and the wireless power receiving unit 450 transmit and receive the PRU static signal and the PTU static signal, the wireless power receiving unit 450 periodically transmits a PRU dynamic signal in steps S414 and S415. The PRU dynamic signal includes at least one parameter information measured by the wireless power receiving unit 450. For example, the PRU dynamic signal may include voltage information of a back end of the rectifier of the wireless power receiving unit 450. The state of the wireless power receiving unit 450 may be called a boot state in step S407.

The wireless power transmitting unit 400 enters a power transmission mode in step S416 and transmits a PRU control signal corresponding to a command signal to allow the wireless power receiving unit 450 to be charged in step S417. In the power transmission mode, the wireless power transmitting unit 400 transmits charging power.

The PRU control signal transmitted by the wireless power transmitting unit 400 may include information enabling/disabling the charging of the wireless power receiving unit 450 and permission information. The PRU control signal is transmitted whenever a charging state is changed. The PRU control signal may be transmitted, for example, every 250 ms, or transmitted when a parameter is changed. The PRU control signal may be set to be transmitted within a preset threshold, for example, within one second even though the parameter is not changed.

The wireless power receiving unit 450 may change a configuration according to the PRU control signal and transmits the PRU dynamic signal for reporting the state of the wireless power receiving unit 450 in steps S418 and S419. The PRU dynamic signal transmitted by the wireless power receiving unit 450 may include at least one of information on a voltage, a current, a state of the wireless power receiving unit, and temperature. The state of the wireless power receiving unit 450 is called an on state in step S421.

Meanwhile, the PRU dynamic signal may have a data structure as shown in Table 1 below.

TABLE 1

| Field | octets | description | use | units |
|---|---|---|---|---|
| optional fields | 1 | defines which optional fields are populated | mandatory | |
| Vrect | 2 | DC voltage at the output of the rectifier. | mandatory | mV |
| Irect | 2 | DC current at the output of the rectifier. | mandatory | mA |
| Vout | 2 | voltage at charge battery port | optional | mV |
| Iout | 2 | current at charge battery port | optional | mA |
| temperature | 1 | temperature of PRU | optional | Deg C. from −40 C. |
| Vrect min dyn | 2 | The current dynamic minimum rectifier voltage desired | optional | mV |
| Vrect set dyn | 2 | desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

As shown in Table 1, the PRU dynamic signal may include one or more fields. The fields include optional field information, voltage information of a back end of the rectifier of the wireless power receiving unit ('Vrect'), current information of the back end of the rectifier of the wireless power receiving unit ('Irect'), voltage information of a back end of the DC/DC converter of the wireless power receiving unit ('Vout'), current information of the back end of the DC/DC converter of the wireless power receiving unit ('Iout'), temperature information ('temperature'), minimum voltage value information of the back end of the rectifier of the wireless power receiving unit ('Vrect min dyn'), optimal voltage value information of the back end of the rectifier of the wireless power receiving unit ('Vrect set dyn'), maximum voltage value information of the back end of the rectifier of the wireless power receiving unit ('Vrect high dyn'), alert information ('PRU alert') and RFU (Reserved for Future Use). The PRU dynamic signal may include at least one of the above fields.

For example, one or more voltage setting values (for example, the minimum voltage value information (Vrect min dyn) of the back end of the rectifier of the wireless power receiving unit, the optimal voltage value information (Vrect set dyn) of the back end of the rectifier of the wireless power receiving unit, and the maximum voltage value information (Vrect high dyn) of the back end of the rectifier of the wireless power receiving unit) determined according to a charging state may be inserted into corresponding fields and then transmitted. As described above, the wireless power receiving unit having received the PRU dynamic signal controls a wireless charging voltage to be transmitted to each of the wireless power receiving units with reference to the voltage setting values included in the PRU dynamic signal.

Among them, the alert information (PRU Alert) may have a data structure shown in Table 2 below.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

Referring to Table 2, the alert information (PRU Alert) may include a bit for a restart request, a bit for a transition, and a bit for detecting an insertion of a Travel Adapter (TA) (TA detect). The TA detect indicates a bit informing of a connection between the wireless power transmitting unit providing wireless charging and a terminal for wired charging by the wireless power receiving unit. The transition indicates a bit informing the wireless power transmitting unit that the wireless power receiving unit is reset before a communication Integrated Circuit (IC) of the wireless power receiving unit is switched from a Stand Alone (SA) mode to a Non Stand Alone (NSA) mode. Lastly, the restart request indicates a bit informing the wireless power receiving unit that the wireless power transmitting unit is ready to restart the charging when the charging is disconnected since the wireless power transmitting unit reduces power due to the generation of an over current state or an over temperature state and then the state is returned to an original state.

Further, the alert information (PRU Alert) may also have a data structure shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3 above, the alert information may include over voltage, over current, over temperature, PRU self-protection, charge compete, wired charger detect, mode transition and the like. When the over voltage field is set as "1", it may indicate that a voltage Vrect of the wireless power receiving unit exceeds a limit of the over voltage. Further, the over current and the over temperature may be set in the same way as the over voltage. The PRU self-protection indicates that the wireless power receiving unit directly reduces a load of power and thus protects itself. In this event, the wireless power transmitting unit is not required to change a charging state.

Bits for a mode transition according to an embodiment of the present invention may be set as a value informing the wireless power transmitting unit of a period during which a mode transition process is performed. The bits indicating the mode transition period may be expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4 above, "00" indicates that there is no mode transition, "01" indicates that a time required for completing the mode transition is a maximum of two seconds, "10" indicates that a time required for completing the mode transition is a maximum of three seconds, and "11" indicates that a time required for completing the mode transition is a maximum of six seconds.

For example, when three seconds or less are spent for completing the mode transition, the mode transition bit may be set as "10". Prior to starting the mode transition process, the wireless power receiving unit may make a restriction such that there is no change in impedance during the mode transition process by changing an input impedance setting to match 1.1 W power draw. Accordingly, the wireless power transmitting unit may control power (ITX_COIL) for the wireless power receiving unit in accordance with the setting, and accordingly, maintain the power (ITX_COIL) for the wireless power receiving unit during the mode transition period.

Accordingly, when the mode transition period is set by the mode transition bit, the wireless power transmitting unit maintains the power (ITX_COIL) for the wireless power receiving unit during the mode transition time, for example, three seconds. That is, the wireless power transmitting unit may maintain a connection even though a response is not received from the wireless power receiving unit for three seconds. However, after the mode transition time passes, the wireless power receiving unit may be considered as a rogue object (foreign substance) and thus power transmission may be terminated.

Meanwhile, the wireless power receiving unit 450 may detect generation of errors. The wireless power receiving unit 450 transmits an alert signal to the wireless power transmitting unit 400 in step S420. The alert signal may be transmitted as the PRU dynamic signal or the alert signal. For example, the wireless power receiving unit 450 may transmit the PRU alert field of Table 3 reflecting an error state to the wireless power transmitting unit 400. Alternatively, the wireless power receiving unit 450 may transmit a single alert signal indicating the error state to the wireless power transmitting unit 400. When receiving the alert signal, the wireless power transmitting unit 400 enters a latch fault mode in step S422, and the wireless power receiving unit 450 may enter a null state in step S423.

Figure 5:
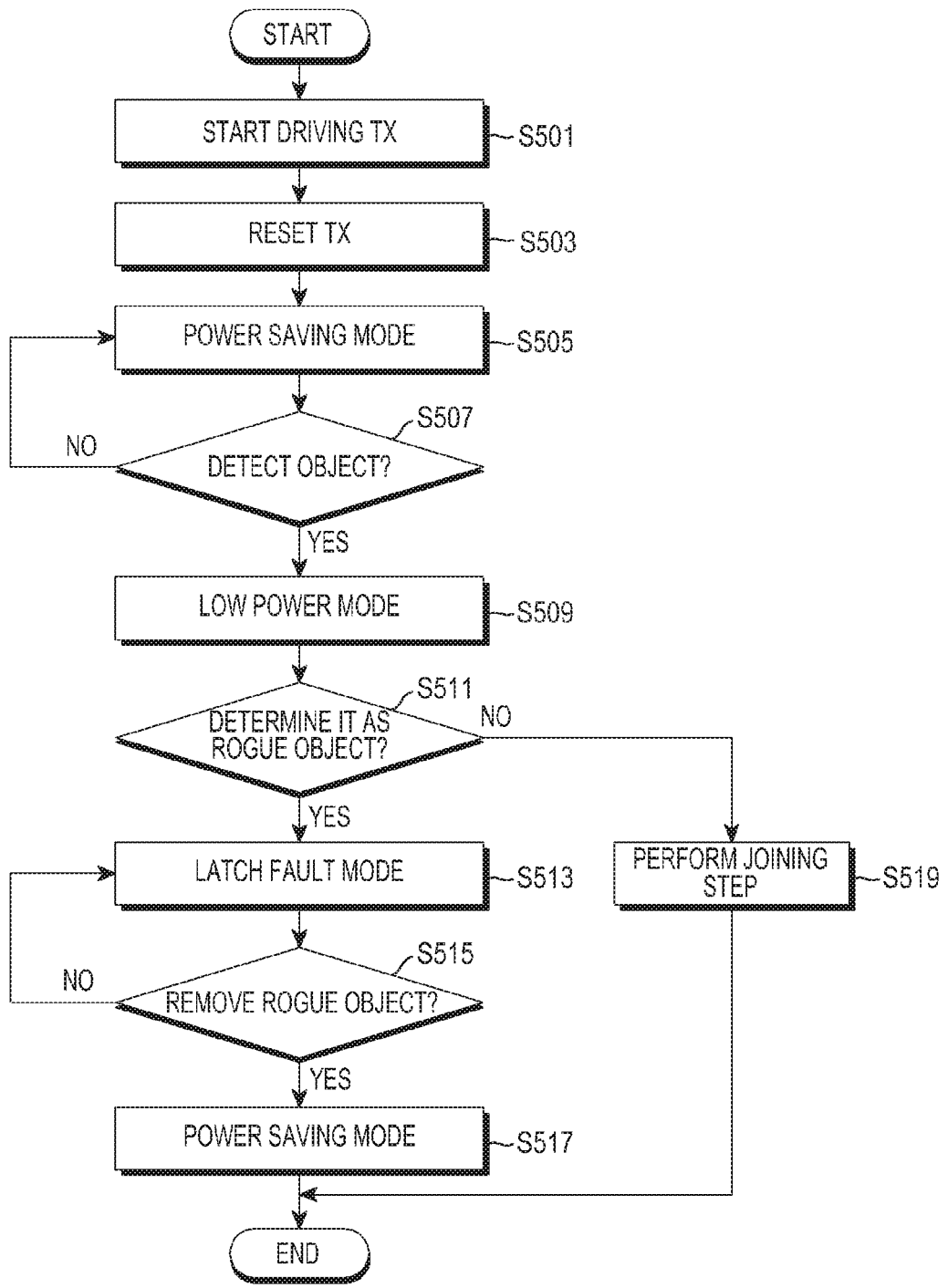
FIG. 5 is a flowchart illustrating operations of a wireless power transmitting unit and a wireless power receiving unit according to another embodiment of the present invention.
Figure 6:
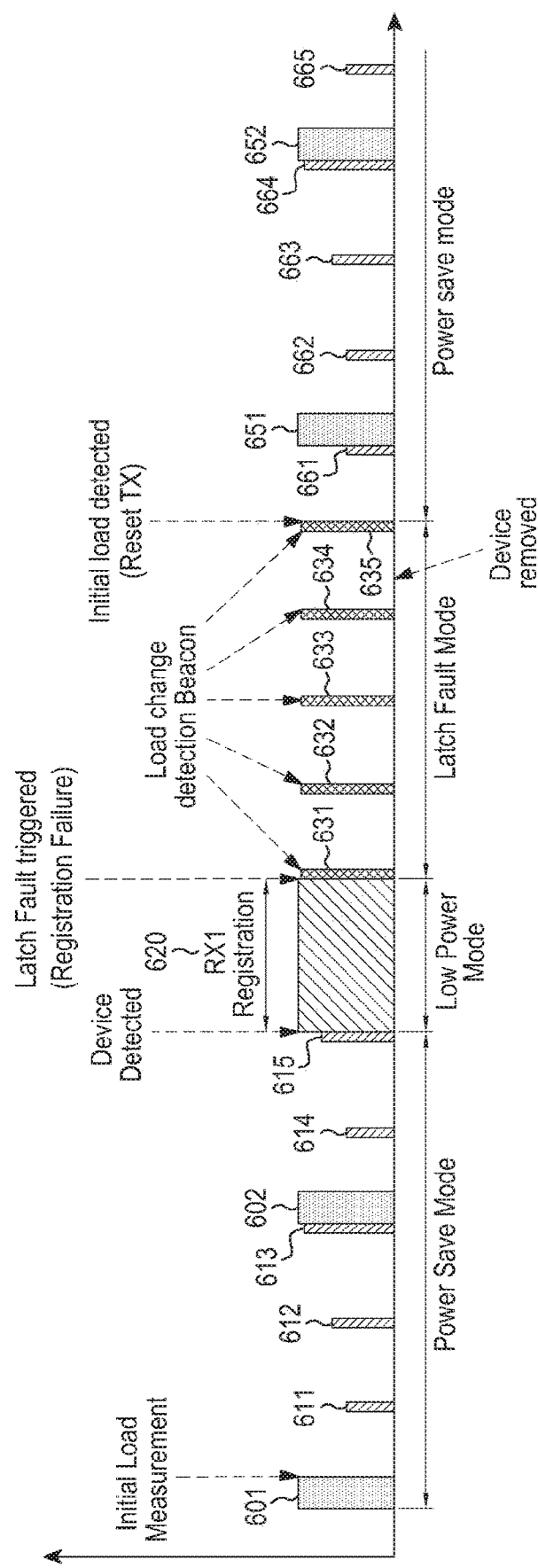
FIG. 6 is a graph on an x axis of an amount of power applied by a wireless power transmitting unit.

FIG. 5 is a flowchart illustrating operations of the wireless power transmitting unit and the wireless power receiving unit according to another embodiment of the present invention. A control method of FIG. 5 will be described in more detail with reference to FIG. 6. FIG. 6 is a graph on an x axis of a power amount applied by the wireless power transmitting unit according to the embodiment of FIG. 5.

As illustrated in FIG. 5, the wireless power transmitting unit initiates the operation in step S501. Further, the wireless power transmitting unit resets an initial configuration in step S503. The wireless power transmitting unit enters a power saving mode in step S505. The power saving mode may correspond to an interval where the wireless power transmitting unit applies power having different amounts to the power transmitter. For example, the power saving mode may correspond to an interval where the wireless power transmitting unit applies second power 601 and 602 and third power 611, 612, 613, 614, and 615 to the power transmitter in FIG. 6. The wireless power transmitting unit periodically applies the second power 601 and 602 according to a second period. When the wireless power transmitting unit applies the second power 601 and 602, the application continues for a second term. The wireless power transmitting unit periodically applies the third power 611, 612, 613, 614, and 615 according to a third period. When the wireless power transmitting unit applies the third power 611, 612, 613, 614, and 615, the application continues for a third term. Meanwhile, although it is illustrated that power values of the third power 611, 612, 613, 614, and 615 are different from each other, the power values of the third power 611, 612, 613, 614, and 615 may be different or the same.

The wireless power transmitting unit may output the third power 611 and then output the third power 612 having the same size of the power amount. As described above, when the wireless power transmitting unit outputs the third power having the same size, the power amount of the third power may have a power amount by which a smallest wireless power receiving unit, for example, a wireless power receiving unit designated as Category 1 can be detected.

The wireless power transmitting unit may output the third power 611 and then output the third power 612 having a different size of the power amount. As described above, when the wireless power transmitting unit outputs the third power having the different size, the power amount of the third power may be a power amount by which a wireless power receiving unit designated as Category 1 to Category 5 can be detected. For example, when the third power 611 may have a power amount by which a wireless power receiving unit of Category 5 can be detected, the third power 612 may have a power amount by which a wireless power receiving unit designated as Category 3 can be detected, and the third power 613 may have a power amount by which a wireless power receiving unit designated as Category 1 can be detected.

Meanwhile, the second power 601 and 602 may be power which can drive the wireless power receiving unit. More specifically, the second power 601 and 602 may have a power amount which can drive the controller and the communication unit of the wireless power receiving unit.

The wireless power transmitting unit applies the second power 601 and 602 and the third power 611, 612, 613, 614, and 615 to the power receiver according to a second period and a third period, respectively. When the wireless power receiving unit is arranged on the wireless power transmitting unit, impedance viewed from a point of the wireless power transmitting unit may be changed. The wireless power transmitting unit detects a change in the impedance while the second power 601 and 602 and the third power 611, 612, 613, 614, and 615 are applied. For example, the wireless power transmitting unit may detect the change in the impedance while the third power 615 is applied. Accordingly, referring back to FIG. 5, the wireless power transmitting unit detects an object in step S507. When the object is not detected in step S507, the wireless power transmitting unit maintains a power saving mode in which different power is periodically applied.

Meanwhile, when there is the change in the impedance and thus the object is detected in step S507, the wireless power transmitting unit enters a low power mode in step S509. The low power mode is a mode in which the wireless power transmitting unit applies driving power having a power amount by which the controller and the communication unit of the wireless power receiving unit can be driven. For example, in FIG. 6, the wireless power transmitting unit applies driving power 620 to the power transmitter. The wireless power receiving unit receives the driving power 620 to drive the controller and the communication unit. The wireless power receiving unit performs communication with the wireless power transmitting unit according to a predetermined scheme based on the driving power 620. For example, the wireless power receiving unit may transmit/receive data required for an authentication and join the wireless power network managed by the wireless power transmitting unit based on the data. However, when a rogue object is arranged instead of the wireless power receiving unit, data transmission/reception cannot be performed. Accordingly, the wireless power transmitting unit determines whether the arranged object is a rogue object in step S511. For example, when the wireless power transmitting unit does not receive a response from the object within a preset time, the wireless power transmitting unit may determine the object as a rogue object.

When the object is determined as a rogue object in step S511, the wireless power transmitting unit enters a latch fault mode. When the object is not determined as a rogue object in step S511, the wireless power transmitting unit performs a joining step in step S519. For example, the wireless power transmitting unit may periodically apply first power 631 to 634 according to a first period in FIG. 6. The wireless power transmitting unit may detect a change in impedance while applying the first power. For example, when the rogue object is withdrawn, the impedance change may be detected and the wireless power transmitting unit determines that the rogue object is withdrawn. Alternatively, when the rogue object is not withdrawn, the wireless power transmitting unit does not detect the impedance change and determines that the rogue object is not withdrawn. When the rogue object is not withdrawn, the wireless power transmitting unit may output at least one of a lamp and a warning sound to inform a user that a state of the wireless power transmitting unit is an error state. Accordingly, the wireless power transmitting unit includes an output unit that outputs at least one of a lamp and a warning sound.

When it is determined that the rogue object is not withdrawn in step S515, the wireless power transmitting unit maintains the latch fault mode in step S513. When it is determined that the rogue object is withdrawn in step S515, the wireless power transmitting unit enters the power saving mode again in step S517. For example, the wireless power transmitting unit may apply second power 651 and 652 and third power 661 to 665, as shown in FIG. 6.

As described above, when the rogue object is arranged instead of the wireless power receiving unit, the wireless power transmitting unit enters the latch fault mode. Further, the wireless power transmitting unit determines whether to withdraw the rogue object by the impedance change based on the power applied in the latch fault mode. That is, a condition of the entrance into the latch fault mode in the embodiment of FIGS. 5 and 6 may be the arrangement of the rogue object. Meanwhile, the wireless power transmitting unit may have various latch fault mode entrance conditions as well as the arrangement of the rogue object. For example, the wireless power transmitting unit may be cross-connected with the arranged wireless power receiving unit and may enter the latch fault mode in the above case.

Accordingly, when cross-connection is generated, the wireless power transmitting unit is required to return to an initial state and the wireless power receiving unit is required to be withdrawn. The wireless power transmitting unit may set the cross-connection by which the wireless power receiving unit arranged on another wireless power transmitting unit joins the wireless power network as the latch fault mode entrance condition. An operation of the wireless power transmitting unit when the error is generated which includes the cross-connection will be described with reference to FIG. 7.

Figure 7:
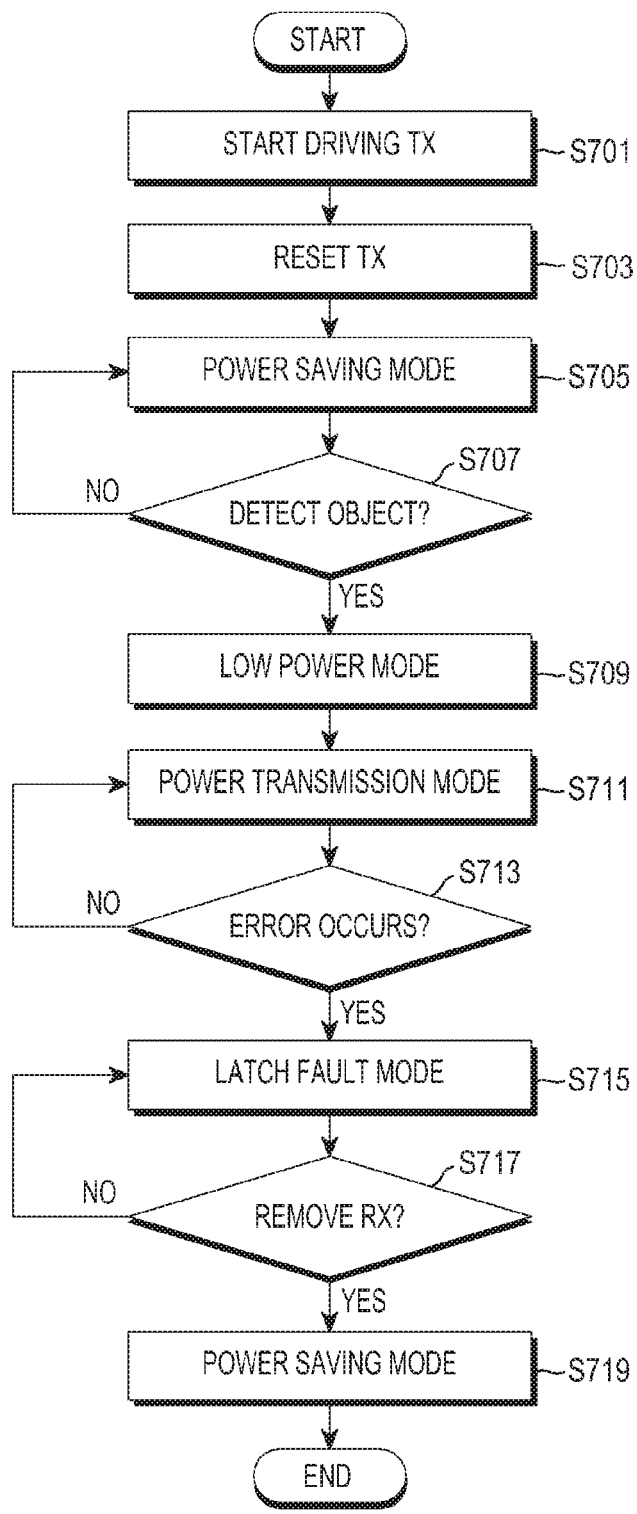
FIG. 7 is a flowchart illustrating a control method of a wireless power transmitting unit according to an embodiment of the present invention.
Figure 8:
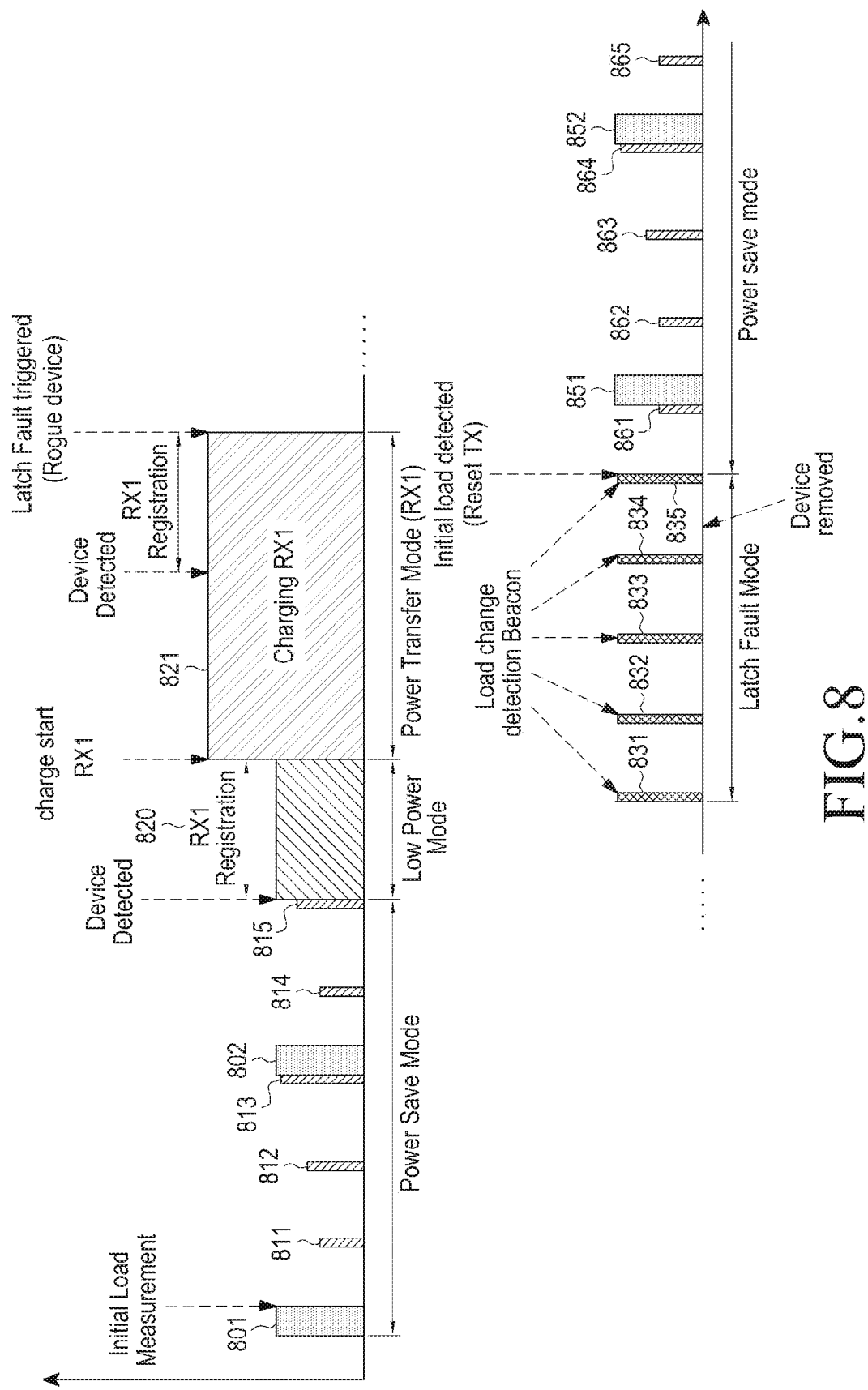
FIG. 8 is a graph on an x axis of an amount of power applied by a wireless power transmitting unit according to the embodiment of FIG. 7.

FIG. 7 is a flowchart illustrating a control method of the wireless power transmitting unit according to an embodiment of the present invention. The control method of FIG. 7 will be described in more detail with reference to FIG. 8. FIG. 8 is a graph on an x axis of a power amount applied by the wireless power transmitting unit according to the embodiment of FIG. 7.

The wireless power transmitting unit initiates the operation in step S701. Further, the wireless power transmitting unit resets an initial configuration in step S703. The wireless power transmitting unit enters the power saving mode in step S705. The power saving mode is an interval where the wireless power transmitting unit applies power having different amounts to the power transmitter. For example, the power saving mode may correspond to an interval where the wireless power transmitting unit applies second power 801 and 802 and third power 811, 812, 813, 814, and 815 to the power transmitter in FIG. 8. The wireless power transmitting unit periodically applies the second power 801 and 802 according to a second period. When the wireless power transmitting unit applies the second power 801 and 802, the application continues for a second term. The wireless power transmitting unit periodically applies the third power 811, 812, 813, 814, and 815 according to a third period. When the wireless power transmitting unit applies the third power 811, 812, 813, 814, and 815, the application continues for a third term. Meanwhile, although it is illustrated that power values of the third power 811, 812, 813, 814, and 815 are different from each other, the power values of the third power 811, 812, 813, 814, and 815 may be different or the same.

Meanwhile, the second power 801 and 802 may be power which can drive the wireless power receiving unit. More specifically, the second power 601 and 602 may have a power amount which can drive the controller and the communication unit of the wireless power receiving unit.

The wireless power transmitting unit applies the second power 801 and 802 and the third power 811, 812, 813, 814, and 815 to the power receiver according to a second period and a third period, respectively. When the wireless power receiving unit is arranged on the wireless power transmitting unit, impedance viewed from a point of the wireless power transmitting unit may be changed. The wireless power transmitting unit detects the impedance change while the second power 801 and 802 and the third power 811, 812, 813, 814, and 815 are applied. For example, the wireless power transmitting unit may detect the impedance change while the third power 815 is applied. Accordingly, referring back to FIG. 7, the wireless power transmitting unit detects an object in step S707. When the object is not detected in step S707, the wireless power transmitting unit maintains the power saving mode in which different power is periodically applied in step S705.

Meanwhile, when the impedance is changed and thus the object is detected in step S707, the wireless power transmitting unit enters the low power mode in step S709. The low power mode is a mode in which the wireless power transmitting unit applies driving power having a power amount by which the controller and the communication unit of the wireless power receiving unit can be driven. For example, in FIG. 8, the wireless power transmitting unit applies driving power 820 to the power transmitter. The wireless power receiving unit receives the driving power 820 to drive the controller and the communication unit. The wireless power receiving unit performs communication with the wireless power transmitting unit according to a predetermined scheme based on the driving power 820. For example, the wireless power receiving unit may transmit/receive data required for an authentication and join the wireless power network managed by the wireless power transmitting unit based on the data.

Thereafter, the wireless power transmitting unit enters the power transmission mode in which charging power is transmitted in step S711. For example, the wireless power transmitting unit applies charging power 821 and the charging power may be transmitted to the wireless power receiving unit as illustrated in FIG. 8.

The wireless power transmitting unit determines whether an error is generated in the power transmission mode. The error may be the arrangement of a rogue object on the wireless power transmitting unit, the cross-connection, over voltage, over current, over temperature and the like. The wireless power transmitting unit may include a sensing unit that may measure the over voltage, the over current, over temperature and the like. For example, the wireless power transmitting unit may measure a voltage or a current at a reference position. When the measured voltage or current is larger than a threshold, it is determined that conditions of the over voltage or the over current are satisfied. Alternatively, the wireless power transmitting unit may include a temperature sensing means which measures temperature at a reference position of the wireless power transmitting unit. When temperature at the reference position is larger than a threshold, the wireless power transmitting unit determines that a condition of the over temperature is satisfied.

Meanwhile, when an over voltage, over current, or over temperature state is determined according to a measurement value of the temperature, voltage, or current, the wireless power transmitting unit prevents the over voltage, over current, or over temperature by reducing the wireless charging power by a preset value. At this time, when a voltage value of the reduced wireless charging power is less than a preset minimum value (for example, the minimum voltage value (VRECT MIN DYN) of the back end of the rectifier of the wireless power receiving unit), the wireless charging is interrupted or stopped, so that the voltage setting value may be re-controlled according to an embodiment of the present invention.

Although it has been illustrated that the error is generated since the rogue object is additionally arranged on the wireless power transmitting unit in the embodiment of FIG. 8, the type of error is not limited thereto and it will be easily understood by those skilled in the art that the wireless power transmitting unit operates through a similar process with respect to the arrangement of the rogue object, the cross-connection, the over voltage, the over current, and the over temperature.

When the error is not generated in step S713, the wireless power transmitting unit maintains the power transmission mode in step S711. Meanwhile, when the error is generated in step S713, the wireless power transmitting unit enters the latch fault mode in step S715. For example, the wireless power transmitting unit applies first power 831 to 835 as illustrated in FIG. 8. Further, the wireless power transmitting unit may output an error generation display including at least one of a lamp and a warning sound during the latch fault mode. When it is determined that the rogue object is not withdrawn in step S717, the wireless power transmitting unit maintains the latch fault mode in step S715. Meanwhile, when it is determined that the rogue object is withdrawn in step S717, the wireless power transmitting unit enters the power saving mode again in step S719. For example, the wireless power transmitting unit applies second power 851 and 852 and third power 861 to 865 of FIG. 8.

In the above description, the operation in a case where the error is generated while the wireless power transmitting unit transmits the charging power has been discussed. Hereinafter, an operation in a case where a plurality of wireless power receiving units on the wireless power transmitting unit receive charging power will be described.

Figure 9:
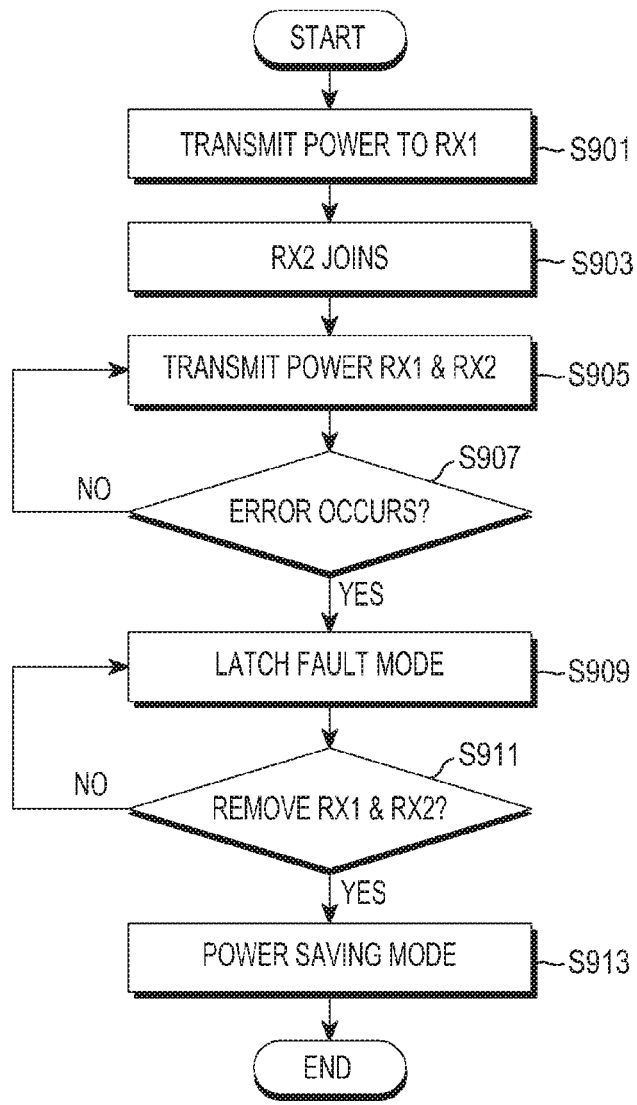
FIG. 9 is a flowchart illustrating a control method of a wireless power transmitting unit according to an embodiment of the present invention.
Figure 10:
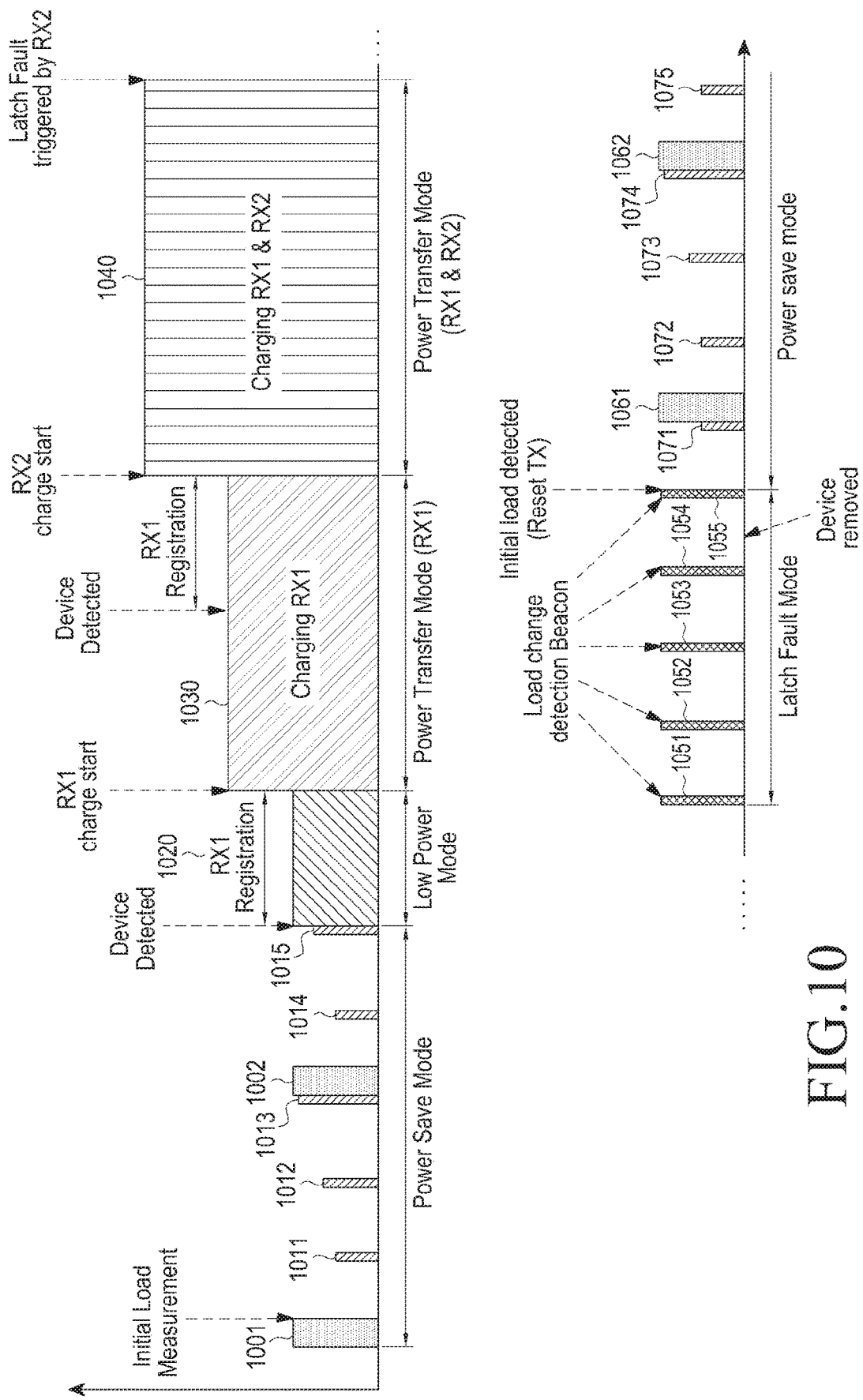
FIG. 10 is a graph on an x axis of an amount of power applied by a wireless power transmitting unit according to the embodiment of FIG. 9.

FIG. 9 is a flowchart for describing a control method of a wireless power transmitting unit according to an embodiment of the present invention. The control method of FIG. 9 will be described in more detail with reference to FIG. 10. FIG. 10 is a graph on an x axis of an amount of power applied by a wireless power transmitting unit according to the embodiment of FIG. 9.

As illustrated in FIG. 9, the wireless power transmitting unit transmits charging power to a first wireless power receiving unit in step S901. Further, the wireless power transmitting unit may allow a second wireless power receiving unit to additionally join the wireless power network in step S903. The wireless power transmitting unit transmits charging power to the second wireless power receiving unit in step S905. More specifically, the wireless power transmitting unit applies a sum of the charging power required by the first wireless power receiving unit and the second wireless power receiving unit to the power receiver.

FIG. 10 illustrates an embodiment of steps S901 to S905. For example, the wireless power transmitting unit maintains the power saving mode in which second power 1001 and 1002 and third power 1011 to 1015 are applied. Thereafter, the wireless power transmitting unit detects the first wireless power receiving unit and enters the low power mode in which a detection power 1020 applied to the first wireless power receiving unit to detect is maintained. Next, the wireless power transmitting unit enters the power transmission mode in which first charging power 1030 is applied. The wireless power transmitting unit detects the second wireless power receiving unit and allows the second wireless power receiving unit to join the wireless power network. Further, the wireless power transmitting unit applies second charging power 1040 having a power amount corresponding to a sum of power amounts required by the first wireless power receiving unit and the second wireless power receiving unit.

Referring back to FIG. 9, the wireless power transmitting unit detects error generation in step S907 while charging power is transmitted to both the first and second wireless power receiving units in step S905. As described above, the error may be the arrangement of the rogue object, the cross-connection, the over voltage, the over current, the over temperature and the like. When the error is not generated in step S907, the wireless power transmitting unit maintains the application of the second charging power 1040.

Meanwhile, when the error is generated in step, the wireless power transmitting unit enters the latch fault mode in step S909. For example, the wireless power transmitting unit applies first power 1051 to 1055 according to a first period in FIG. 10. The wireless power transmitting unit determines whether both the first wireless power receiving unit and the second wireless power receiving unit are withdrawn in step S911. For example, the wireless power transmitting unit may detect an impedance change while applying the first power 1051 to 1055. The wireless power transmitting unit determines whether both the first wireless power receiving unit and the second wireless power receiving unit are withdrawn based on whether the impedance is returned to an initial value.

When it is determined that both the first wireless power receiving unit and the second wireless power receiving unit are withdrawn in step S911, the wireless power receiving unit enters the power saving mode in step S913. For example, the wireless power transmitting unit applies second power 1061 and 1062 and third power 1071 to 1075 according to a second period and a third period, respectively.

As described above, even when the wireless power transmitting unit applies charging power to at least one wireless power receiving unit, the wireless power transmitting unit may determine whether the wireless power receiving unit or the rogue object is easily withdrawn when the error is generated.

Figure 11:
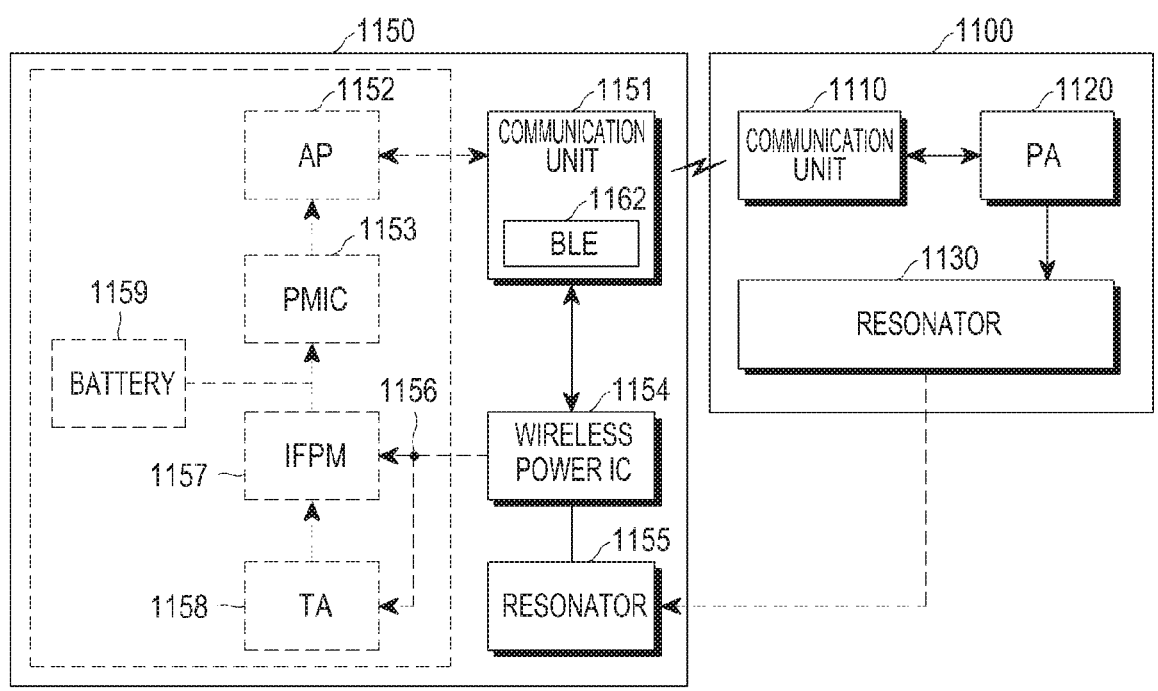
FIG. 11 is a block diagram of a wireless power transmitting unit and a wireless power receiving unit in an SA mode according to an embodiment of the present invention.

FIG. 11 is a block diagram of a wireless power transmitting unit and a wireless power receiving unit in a Stand Alone (SA) mode according to an embodiment of the present invention.

A wireless power transmitting unit 1100 includes a communication unit 1110, a Power Amplifier (PA) 1120, and a resonator 1130. A wireless power receiving unit 1150 includes a communication unit (WPT Communication IC) 1151, an Application Processor (AP) 1152, a Power Management Integrated Circuit (PMIC) 1153, a Wireless Power Integrated Circuit (WPIC) 1154, a resonator 1155, an Inter-Face Power Management (IFPM) IC 1157, a Travel Adapter (TA) 1158, and a battery 1159.

The communication unit 1110 may be implemented by WiFi/BlueTooth (BT) Combo IC and communicates with the communication unit 1151 in a predetermined scheme, for example, a BLE scheme. For example, the communication unit 1151 of the wireless power receiving unit 1150 transmits a PRU dynamic signal having the data structure as shown in Table 3 to the communication unit 1110 of the wireless power transmitting unit 1100. As described above, the PRU dynamic signal includes at least one of voltage information, current information, temperature information, and alert information of the wireless power receiving unit 1150.

Based on the received PRU dynamic signal, a power value output from the power amplifier 1120 is adjusted. For example, when the over voltage, the over current, and the over temperature are applied to the wireless power receiving unit 1150, a power value output from the power amplifier 1120 is reduced. Further, when a voltage or current of the wireless power receiving unit 1150 is less than a preset value, a power value output from the power amplifier 1120 is increased.

Charging power from the resonator 1130 is wirelessly transmitted to the resonator 1155.

The WPIC 1154 rectifies the charging power received from the resonator 1155 and performs DC/DC conversion. The WPIC 1154 drives the communication unit 1151 or charges the battery 1159 by using the converted power.

Meanwhile, a wired charging terminal may be inserted into the travel adapter 1158. A wired charging terminal such as 30-pin connector or a Universal Serial Bus (USB) connector may be inserted into the travel adapter 1158, and the travel adapter 1158 receives power supplied from an external power source to charge the battery 1159.

The IFPM 1157 processes power applied from the wired charging terminal and outputs the processed power to the battery 1159 and the PMIC 1153.

The PMIC 1153 manages wirelessly received power, power received through a wire, and power applied to each of the components of the wireless power receiving unit 1150. The AP 1152 receives power information from the PMIC 1153 and controls the communication unit 1151 to transmit the PRU dynamic signal for reporting the power information.

Meanwhile, the travel adapter 1158 may be connected to a node 1156 connected to the WPIC 1154. When the wired charging connector is inserted into the travel adapter 1158, a preset voltage, for example, 5 V may be applied to the node 1156. The WPIC 1154 monitors the voltage applied to the node 1156 to determine whether the travel adapter is inserted.

Meanwhile, the AP 1152 has a stack in a predetermined communication scheme, for example, a WiFi/BT/BLE stack. Accordingly, in communication for the wireless charging, the communication unit 1151 loads the stack from the AP 1152 and then communicates with the communication unit 1110 of the wireless power transmitting unit 1100 by using a BT or BLE communication scheme based on the stack.

However, a state may occur in which data for performing wireless power transmission cannot be fetched from the AP 1152 since the AP 1152 is turned off or in which power is lost so that the AP 1152 cannot remain in an on state while the data is fetched from a memory within the AP 1152.

When a residual capacity of the battery 1159 is less than a minimum power threshold, the AP 1152 is turned off, and the wireless charging can be performed using some components for the wireless charging within the wireless power receiving unit, for example, the communication unit 1151, the WPIC 1154, and the resonator 1155. A state where the AP 1152 cannot be turned on may be referred to as a dead battery state.

Since the AP 1152 is not driven in the dead battery state, the communication unit 1151 cannot receive a stack in a predetermined communication scheme, for example, a WiFi/BT/BLE stack from the AP 1152. For such a case, some of the stacks in the predetermined communication scheme, for example, the BLE stack, are fetched within the memory 1162 of the communication unit 1151 from the AP 1152 and stored in the memory 1162. Accordingly, the communication unit 1151 communicates with the wireless power transmitting unit 1100 for the wireless charging by using the stack in the communication scheme stored in the memory 1162, that is, a wireless charging protocol. At this time, the communication unit 1151 may include a memory therewithin, and the BLE stack may be stored in a memory in a form of a ROM in the SA mode.

As described above, a mode in which the communication unit 1151 performs the communication by using the stack of the communication scheme stored in the memory 1162 is referred to as the SA mode. Accordingly, the communication unit 1151 manages a charging process based on the BLE stack.

A concept of the wireless charging system which can be applied to the embodiment of the present invention has been described with reference to FIGS. 1 to 11. Hereinafter, a charging control process according to a mode transition according to an embodiment of the present invention will be described in detail with reference to FIGS. 12 to 15.

Figure 12:
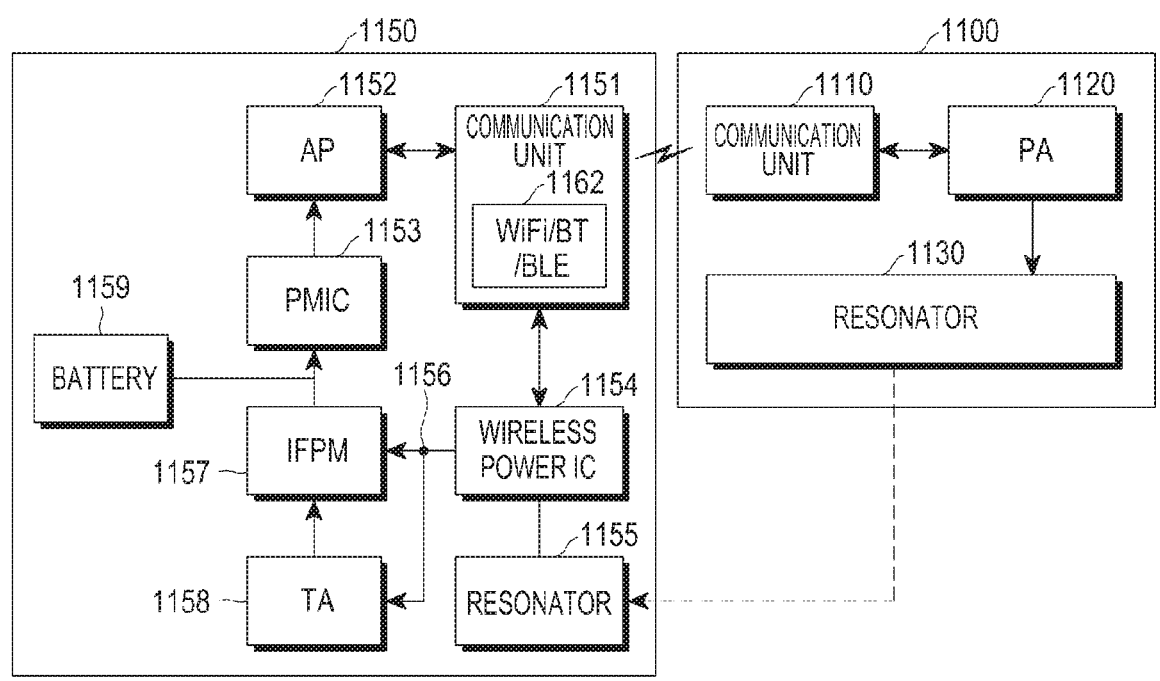
FIG. 12 is a block diagram of a wireless power transmitting unit and a wireless power receiving unit in an NSA mode according to an embodiment of the present invention.

FIG. 12 is a block diagram of the wireless power transmitting unit and the wireless power receiving unit in a Non Stand Alone (NSA) mode according to an embodiment of the present invention. Since each of components in FIG. 12 is the same as each of the components in FIG. 11, a detailed description thereof will be omitted. However, FIG. 12 illustrates a case where the residual capacity of the battery 1159 is greater than the preset threshold and thus the components such as the AP 1152, the PMIC 1153, the IFPM 1157, and the TA 1158 are activated.

When the residual capacity of the battery 1159 is greater than or equal to a minimum power threshold in a state where the AP 1152 is turned off, the AP 1152 awakens to be driven. When the AP 1152 is driven, the communication unit 1151 receives a stack of a predetermined communication scheme, for example, a WiFi/BT/BLE stack from the AP 1152, and loads it to the memory 1162. At this time, the communication unit 1151 may load a communication stack in a form of a ROM fetched from the AP 1152 in the NSA mode and stores the communication stack. As described above, a mode in which the communication unit 1151 receives a stack of a predetermined communication scheme for the wireless charging from the AP 1152 and loads the stack to the memory 1162 is referred to as the Non Stand Alone (NSA) mode.

At this time, as the AP 1152 is driven, a predetermined time is spent until the mode transition is completed.

A mode transition time corresponds to a time required when the wireless power receiving unit 1150 is switched from the SA mode to the NSA mode and may be generally "three seconds". Since the wireless power receiving unit 1150 does not receive a communication response from the wireless power transmitting unit 1100 during the mode transition time, registration time out may occur for one second. Therefore, in the embodiment of the present invention, the wireless power receiving unit 1150 makes a request for maintaining power during the mode transition time by notifying the wireless power transmitting unit 1100 of the generation of the mode transition from the SA mode to the NSA mode through the mode transition bit as shown in Table 3.

Operations in the wireless power transmitting unit and the wireless power receiving unit having the above configuration will be described with reference to FIG. 13.

Figure 13:
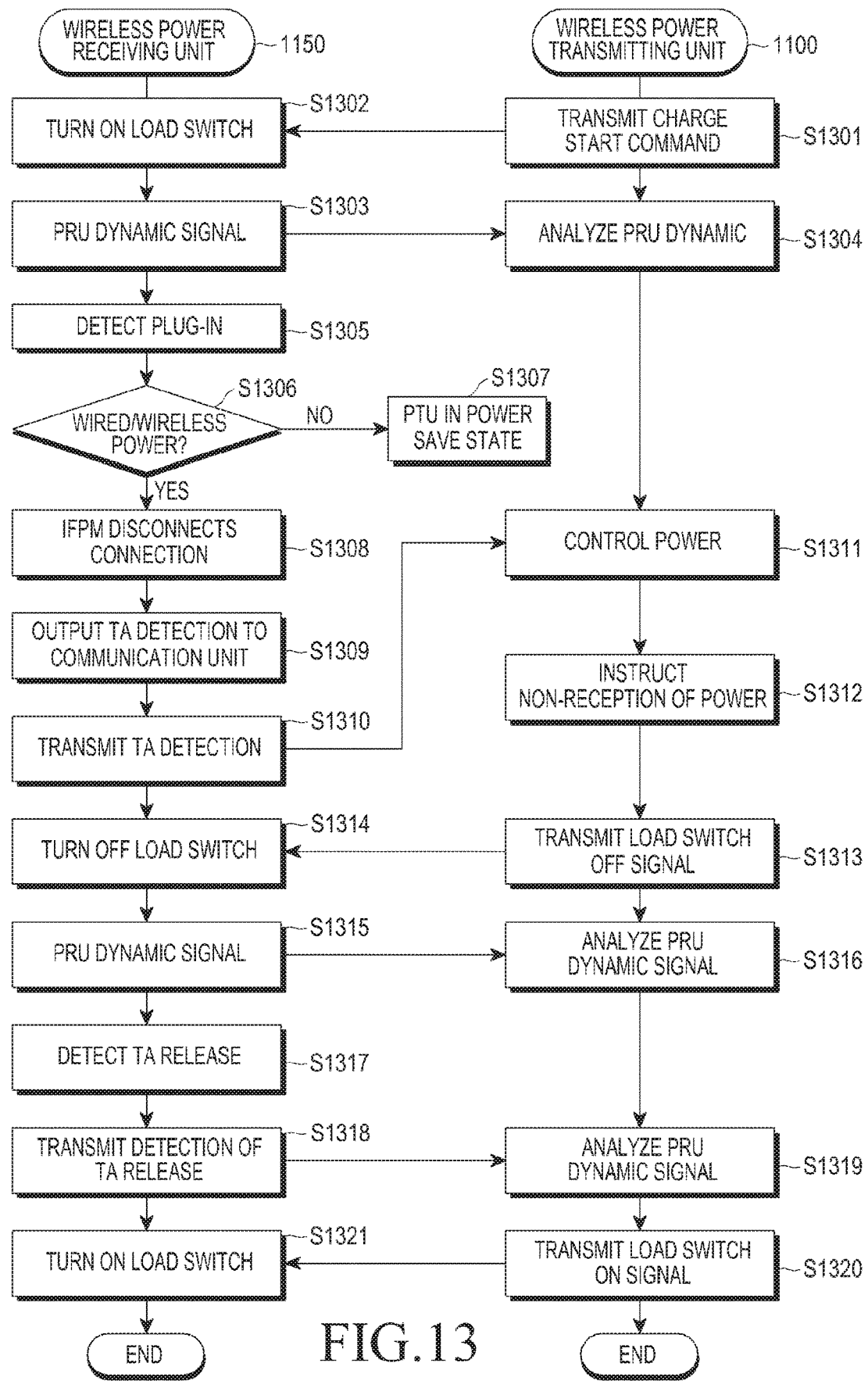
FIG. 13 is a flowchart illustrating operations of a wireless power transmitting unit and a wireless power receiving unit according to an embodiment of the present invention.

FIG. 13 is a flowchart illustrating operations of the wireless power transmitting unit and the wireless power receiving unit according to an embodiment of the present invention.

The wireless power transmitting unit 1100 transmits a charging initiation command signal to the wireless power receiving unit 1150 in step S1301. In response to the signal, the wireless power receiving unit 1150 performs the wireless charging by controlling a load switch to be in an on state in step S1302. The wireless power receiving unit 1150 transmits the PRU dynamic signal in step S1303 and the wireless power transmitting unit 1100 receives and analyzes the PRU dynamic signal in step S1304. Accordingly, the wireless power transmitting unit 1100 may identify information such as the voltage, current, temperature of the wireless power receiving unit 1150 or wireless charging environment change such as the wired charging terminal insertion.

Meanwhile, the user may insert the wired charging terminal into the wireless power receiving unit 1150 and the wireless power receiving unit 1150 detects the insertion in step S1305. The wireless power receiving unit 1150 determines whether wired or wireless power is provided in step S1306. When neither the wired nor wireless power is provided in step S1306, the wireless power transmitting unit 1100 enters the low power mode. When it is determined that both the wired charging and the wireless charging are performed in step S1306, the IFPM 1157 of the wireless power receiving unit 1150 stops the wireless charging by releasing the connection with the resonator 1155 in step S1308.

The wireless power receiving unit 1150 outputs wired charging terminal insertion detection (=TA(Travel Adapter) detection) to the communication unit 1151 in step S1309 and the communication unit 1151 transmits a wired charging terminal insertion detection (=TA(Travel Adapter) detection) signal to the wireless power transmitting unit 1100 in step S1310. The wireless power transmitting unit 1100 controls the charging power in accordance with the wired charging terminal insertion detection signal in step S1311. For example, the wireless power transmitting unit 1100 may make a control such that the wireless charging is stopped by adjusting the charging power to 0.

The wireless power transmitting unit 1100 instructs non-reception of power in step S1312 and transmits a load switch off signal to the wireless power receiving unit 1150 in step S1313. The wireless power receiving unit 1150 receives the load switch off signal to control a load switch to be in an off state in step S1314.

The wireless power receiving unit 1150 periodically transmits the PRU dynamic signal in step S1315. The wireless power transmitting unit 1100 receives and analyzes the PRU dynamic signal in step S1316.

Meanwhile, the wireless power receiving unit 1150 detects that the wired charging terminal insertion has been released in step S1317. For example, the wireless power receiving unit 1150 may detect the release of the wired charging terminal insertion by detecting a changing in a voltage applied to a back end of the travel adapter 1158. The wireless power receiving unit 1150 transmits a wired charging terminal insertion release detection signal to the wireless power transmitting unit 1100 in step S1318. For example, the wireless power receiving unit 1150 may transmit the wired charging terminal insertion release detection signal as the PRU dynamic signal or a single signal. The wireless power transmitting unit 1100 detects the release of the wired charging terminal insertion from the wireless power receiving unit 1150 by analyzing the PRU dynamic signal or the single signal in step S1319.

The wireless power transmitting unit 1100 transmits a load switch on signal to the wireless power receiving unit 1150 in step S1320 and the wireless power receiving unit 1150 receives the load switch on signal to control the load switch to be in the on state in step S1321. Meanwhile, the wireless power transmitting unit 1100 performs the wireless charging by controlling the charging power again and the wireless power receiving unit 1150 performs the wireless charging by controlling the load switch to be in the on state.

According to the above description, the wireless power transmitting unit 1100 detects the insertion or withdrawal of the wired charging terminal into/from the wireless power receiving unit 1150. The wireless power transmitting unit may prevent power waste and over power from being applied to the wireless power receiving unit 1150 by controlling the charging power according to the insertion or the withdrawal of the wired charging terminal.

Meanwhile, when the battery 1159 is discharged while the wireless power receiving unit 1150 performs the above described operation, the AP 1152 cannot be driven. At this time, the wireless power receiving unit 1150 may be arranged on the wireless power transmitting unit 1100 in a state where the battery 1159 is discharged.

In this event, the wireless power receiving unit 1150 drives the communication unit 1151 of the wireless power receiving unit 1150 by receiving a power detection beacon. However, since the AP 1152 is not driven as described above, the communication unit 1151 cannot fetch a stack of a predetermined communication scheme, for example, a wireless charging protocol from the AP 1152. Accordingly, the communication unit 1151 operates in the SA mode in which the communication is performed using the stack of the communication scheme stored in the memory within the communication unit 1151.

Hereinafter, a control process according to the mode transition in the wireless power receiving unit will be described with reference to FIG. 14.

Figure 14:
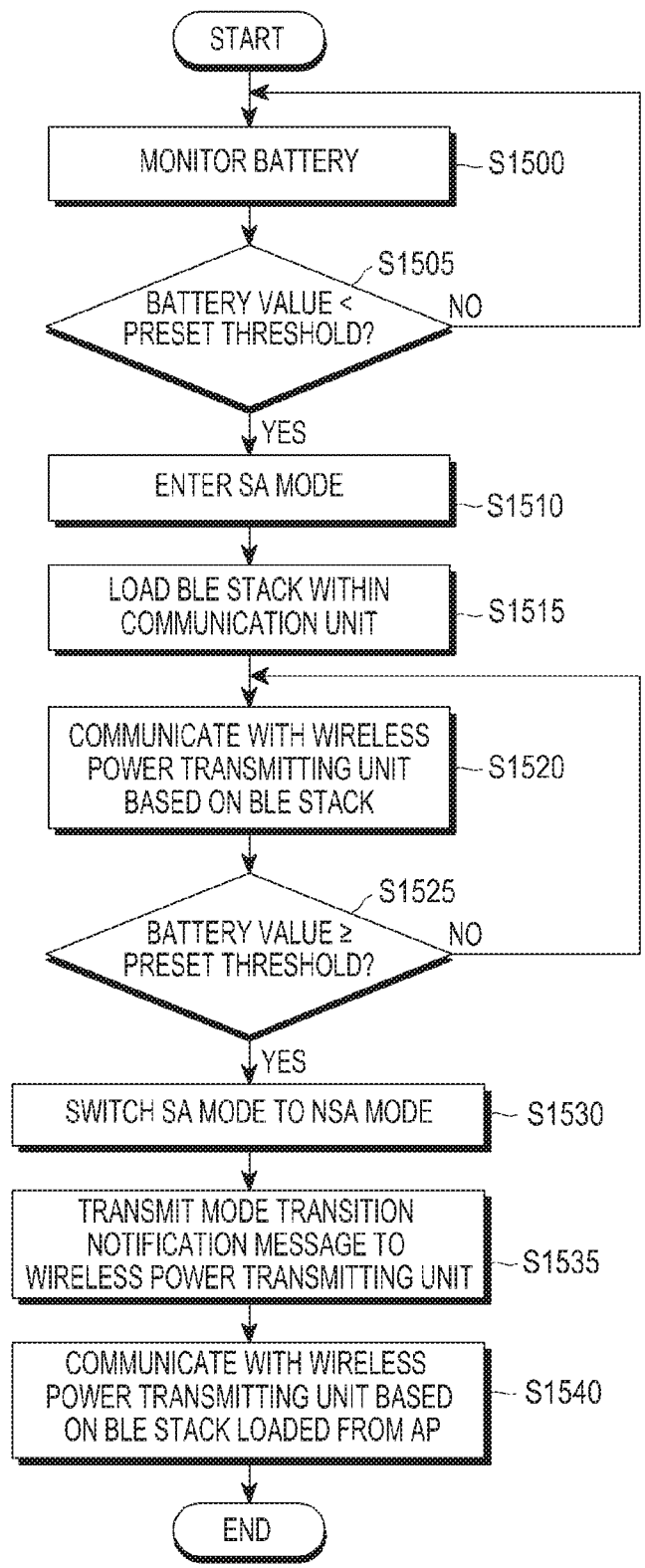
FIG. 14 is a flowchart illustrating a control method of a wireless power receiving unit based on a mode transition according to an embodiment of the present invention.

Referring to FIG. 14, the wireless power receiving unit 1150 monitors the battery 1159 in step S1500 and determines whether a battery value is less than a preset threshold in step S1505. When the battery value is less than the preset threshold, the wireless power receiving unit 1150 may be turned off due to discharging of the battery 1159. In the embodiment of the present invention, it is assumed that the wireless power receiving unit 1150 is arranged on the wireless power transmitting unit 1100 in a state where the battery 1159 is discharged. Accordingly, the wireless power receiving unit 1150 receives first power which can drive the communication unit 1151 from the wireless power transmitting unit 1100 and drives the communication 1151 by using the first power. Therefore, when the battery 1159 is discharged and the battery value is less than the preset threshold, the wireless power receiving unit 1150 enters the SA mode in step S1510.

When entering the SA mode, the wireless power receiving unit 1150 may load, for example, a BLE stack from the memory 1162 within the communication unit 1151 in step S1515. The communication unit 1151 of the wireless power receiving unit 1150 communicates with the wireless power transmitting unit 1100 by using the loaded BLE stack in step S1520.

As described above, the wireless power receiving unit 1150 performs the wireless charging while operating in the SA mode. Based on the performance of the wireless charging, the battery 1159 starts to be charged. Accordingly, it is determined whether the battery value is greater than or equal to the preset threshold in step S1525. When the battery value is greater than or equal to the preset threshold, the wireless power receiving unit 1150 turns on the battery 1159 and the AP 1152. Accordingly, the wireless power receiving unit 1150 switches the SA mode to the NSA mode in step S1530. However, when the battery value is less than the preset threshold, the charged power is not enough to turn on the AP 1152, so the wireless power receiving unit 1150 returns to step S1520 and communicates with the wireless power transmitting unit 1100 for the wireless charging in the SA mode.

At this time, the wireless power transmitting unit 1100 is in a power transfer state, and the communication unit 1151 does not need to be re-initialized during a charging session when the wireless power receiving unit 1150 is turned on. That is, in a process of resetting the communication unit 1151, it is required to end a BLE link between the wireless power receiving unit 1150 and the wireless power transmitting unit 1100 and re-initiate the BLE link. Accordingly, when the wireless power receiving unit 1150 is turned on and thus the re-initiation of the BLE link between the wireless power receiving unit 1150 and wireless power transmitting unit 1100 is needed, the wireless power receiving unit 1150 informs the wireless power transmitting unit 1100 of such a condition by generating a mode transition notification message.

The mode transition notification message may use the alert information (PRU Alert) as shown in Table 3 above. Accordingly, the mode transition notification message is a message making a request for maintaining power for the mode transition time and may include a time required when the mode transition is completed as shown in Table 4, that is, a required time according to the mode transition. The mode transition notification message may be generated and transmitted by the communication unit 1151 or the AP 1152.

Accordingly, the wireless power receiving unit 1150 transmits the mode transition notification message to the wireless power transmitting unit 1100 in step S1535. Subsequently, the wireless power receiving unit 1150 loads the WiFi/BT/BLE stack from the AP 1152 and reinitiates the communication with the wireless power transmitting unit 1100 based on the stack in step S1540.

Figure 15:
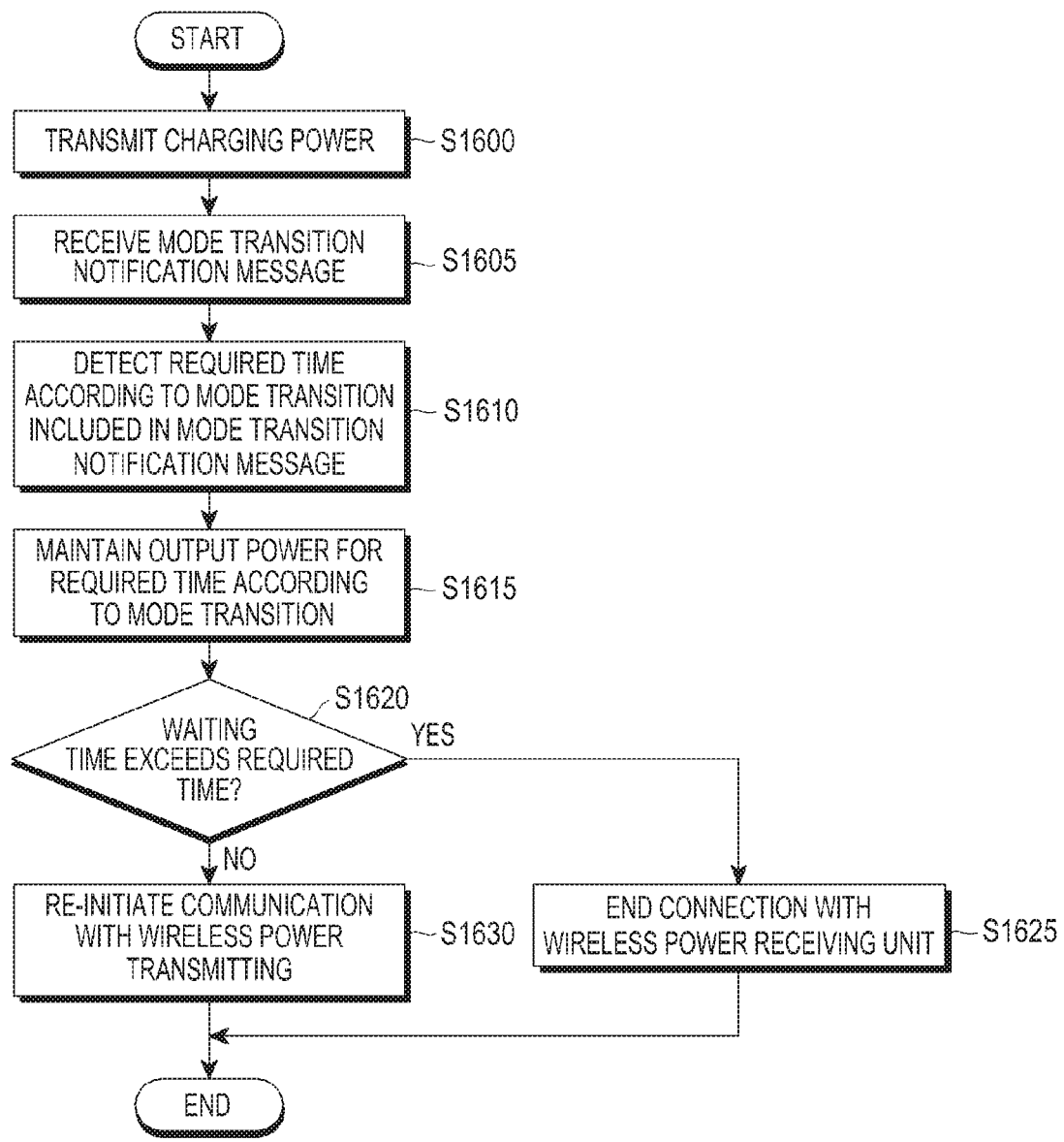
FIG. 15 is a flowchart illustrating a control method of a wireless power transmitting unit based on a mode transition according to an embodiment of the present invention.

Meanwhile, FIG. 15 is a flowchart illustrating a control method of the wireless power transmitting unit based on the mode transition according to an embodiment of the present invention.

Referring to FIG. 15, the wireless power transmitting unit 1100 transmits charging power to the wireless power receiving unit 1150 in step S1600. The wireless power transmitting unit 1100 receives a mode transition notification message notifying of switching from the SA mode to the NSA mode from the wireless power receiving unit 1150 in step S1605. The mode transition notification message includes a required time according to the mode transition set by the wireless power receiving unit 1150. Therefore, the wireless power transmitting unit 1100 detects the required time according to the mode transition included in the mode transition notification message in step S1610. Accordingly, the wireless power transmitting unit 1100 may stand by for the preset time and maintains output power for the required time according to the mode transition in step S1615.

In general, when the wireless power transmitting unit 1100 does not receive a signal from the wireless power receiving unit 1150 for one second, the wireless power transmitting unit 1100 may be set to exclude the wireless power receiving unit 1150 from the wireless power network. However, according to an embodiment of the present invention, when the wireless power transmitting unit 1100 receives the mode transition notification message from the wireless power receiving unit 1150, the wireless power transmitting unit 1100 may not exclude the wireless power receiving unit 1150 from the wireless power network even though the signal is not received from the wireless power receiving unit 1150 for the preset required time.

Accordingly, the wireless power transmitting unit 1100 determines whether the waiting time exceeds the preset required time in step S1620. When the waiting time exceeds the preset required time, the wireless power transmitting unit 1100 may consider the wireless power receiving unit as a rogue object and excludes the wireless power receiving unit from the wireless power network in step S1630. That is, the wireless power transmitting unit 1100 terminates the connection with the wireless power receiving unit 1150. However, when the waiting time is within the preset required time, the wireless power transmitting unit 1100 communicates with the wireless power receiving unit 1150 again in step S1630.

According to the above description, when the wireless power receiving unit 1150 switches the SA mode to the NSA mode, the communication with the wireless power transmitting unit 1100 may be disconnected for a predetermined time. However, even though the signal is not received from the wireless power receiving unit 1150 for the preset waiting time, the wireless power transmitting unit 1100 may not exclude the wireless power receiving unit 1150 from the wireless power network by receiving the switching signal from the SA mode to the NSA mode. Accordingly, an unintended error by the mode transition of the wireless power receiving unit can be prevented.

According to the above description, the wireless power transmitting unit 1100 may detect a change in a wireless power transmission environment such as the mode transition and may not exclude the wireless power receiving unit 1150 from the wireless power network.

Various embodiments of the present invention provide a wireless power receiving unit which can notify of, when a wireless power transmission environment change is detected, the change to a wireless power transmitting unit, and a control method thereof. Further, the present invention provides a wireless power transmitting unit which receives a signal for the detection of the wireless power transmission environment change from a wireless power receiving unit and a control method thereof.

In addition, when a charging environment is changed like in a case where the wireless power receiving unit switches from the SA mode to the NSA mode, the wireless transmitting unit recognizes a mode transition condition of the wireless power receiving unit through a message notifying of the change. Accordingly, even though the wireless power transmitting unit does not receive a signal from the wireless power receiving unit for a predetermined time, the wireless power transmitting unit can stand by for a predetermined time until the mode transition is completed without a disconnection with the wireless power receiving unit.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or concept of the present invention.

What is claimed is:

1. A control method of a wireless power receiver, the control method comprising:
   wirelessly receiving a first power from a wireless power transmitter;
   based on the received first power, loading a first communication stack stored in a first memory inside a communication module of the wireless power receiver;
   establishing a communication connection with the wireless power transmitter based on the first communication stack;
   wirelessly receiving a second power from the wireless power transmitter;
   based on a residual capacity of a battery of the wireless power receiver exceeding a minimum power threshold according to the received second power, determining to re-initialize the communication connection with the wireless power transmitter;
   based on the determining to re-initialize the communication connection with the wireless power transmitter, transmitting a message including a time period required to complete at least one procedure for re-initializing the communication connection with the wireless power transmitter;
   re-initializing the communication connection with the wireless power transmitter while wirelessly receiving the second power;
   after re-initializing the communication connection, loading a second communication stack stored in a second memory outside the first memory of the communication module of the wireless power receiver; and
   establishing, the communication connection with the wireless power transmitter based on the second communication stack.

2. The control method of claim 1, wherein the at least one procedure for re-initializing the communication connection with the wireless power transmitter comprises:
   stopping the communication connection with the wireless power transmitter based on the loaded first communication stack; and
   communicating with the wireless power transmitter based on a second communication stack.

3. The control method of claim 1, wherein the loading of the first communication stack stored in the first memory comprises:
   based on the residual capacity of the battery being less than or equal to the minimum power threshold, determining to communicate with the wireless power transmitter based on the first communication stack.

4. The control method of claim 1, wherein the message is a power receiving unit (PRU) alert signal, and
   wherein the PRU alert signal includes information regarding the time period.

5. The control method of claim 4, wherein the information regarding the time period includes bits for indicating the time period.

6. The control method of claim 5, wherein the bits for indicating the time period are one of a first value, a second value, a third value, or a fourth value.

7. The control method of claim 6, wherein the first value indicates no mode transition, the second value indicates that the time period is 2 seconds, the third value indicates that the time period is 3 seconds, and the fourth value indicates that the time period is 6 seconds.

8. The control method of claim 1, wherein the message notifies the wireless power transmitter that no communication between the wireless power transmitter and the wireless power receiver is possible for the time period.

9. A wireless power receiver, comprising:
   a communication module; and
   a power receiving resonator,
   wherein the communication module is configured to:
     load a first communication stack stored in a first memory inside the communication module of the wireless power receiver based on a first power received from a wireless power transmitter through the power receiving resonator,
     establish a communication connection with the wireless power transmitter based on the first communication stack, based on the first power received through the power receiving resonator, wherein a second power is received through the power receiving resonator after establishing the communication connection, based on a residual capacity of a battery of the wireless power receiver exceeding a minimum power threshold according to the received second power, determine to re-initialize the communication connection with the wireless power transmitter, based on the determining to re-initialize the communication connection with the wireless power transmitter, transmit a message including a time period required to complete at least one procedure for re-initializing the communication connection with the wireless power transmitter, re-initialize the communication connection with the wireless power transmitter while the power receiving resonator wirelessly receives the second power, after re-initializing the communication connection, load a second communication stack stored in a second memory outside the first memory of the communication module of the wireless power receiver, and establish the communication connection with the wireless power transmitter based on the second communication stack.

10. The wireless power receiver of claim 9, wherein the at least one procedure for re-initializing the communication connection with the wireless power transmitter comprises:

stopping the connection communication with the wireless power transmitter based on the loaded first communication stack; and communicating with the wireless power transmitter based on the second communication stack.

11. The wireless power receiver of claim 9, wherein the communication module is further configured to:

based on the residual capacity of the battery being less than or equal to the minimum power threshold, determine to communicate with the wireless power transmitter based on the first communication stack.

12. The wireless power receiver of claim 9, wherein the message is a power receiving unit (PRU) alert signal, and
wherein the PRU alert signal includes information regarding the time period.

13. The wireless power receiver of claim 12, wherein the information regarding the time period includes bits for indicating the time period.

14. The wireless power receiver of claim 13, wherein the bits for indicating the time period are one of a first value, a second value, a third value, or a fourth value.

15. The wireless power receiver of claim 14, wherein the first value indicates no mode transition, the second value indicates that the time period is 2 seconds, the third value indicates that the time period is 3 seconds, and the fourth value indicates that the time period is 6 seconds.

16. The wireless power receiver of claim 9, wherein the message notifies the wireless power transmitter that no communication between the wireless power transmitter and the wireless power receiver is possible for the time period.

17. A control method of a wireless power transmitter, the control method comprising:

wirelessly transmitting a first power to a wireless power receiver;

establishing a communication connection with the wireless power receiver;

wirelessly transmitting a second power to the wireless power receiver;

receiving a message including a time period required to complete at least one procedure for re-initializing the communication connection with the wireless power receiver; and wirelessly transmitting the second power to the wireless power receiver while the wireless power receiver re-initializes the communication connection with the wireless power transmitter.

18. The control method of claim 17, wherein the message is a power receiving unit (PRU) alert signal, and
wherein the PRU alert signal includes information regarding the time period.

19. The control method of claim 18, wherein the information regarding the time period includes bits for indicating the time period.

20. The control method of claim 19, wherein the bits for indicating the time period are one of a first value, a second value, a third value, or a fourth value.

21. The control method of claim 17, wherein the message notifies the wireless power transmitter that no communication between the wireless power transmitter and the wireless power receiver is possible for the time period.

22. The control method of claim 17, wherein the wirelessly transmitting of the second power to the wireless power receiver while the wireless power receiver re-initializes the communication connection with the wireless power transmitter comprises:

maintaining transmitting the second power for the time period required to complete the procedure for re-initializing the communication connection starting from a time point at which the message is received.

23. A wireless power transmitter, comprising:
a communication module;
a power transmitting resonator; and
a controller,
wherein the controller is configured to:
control the wireless power transmitter to wirelessly transmit a first power to a wireless power receiver through the power transmitting resonator, establish, by using the communication module, a communication connection with the wireless power receiver, wherein the power transmitting resonator transmits a second power to the wireless power receiver after establishing the communication connection, receiving, by using the communication module, a message including a time period required to complete at least one procedure for re-initializing the communication connection with the wireless power receiver, and control the wireless power transmitter to wirelessly transmit the second power to the wireless power receiver while the wireless power receiver re-initializes the communication connection with the wireless power transmitter.

24. The wireless power transmitter of claim 23, wherein the message is a power receiving unit (PRU) alert signal, and
wherein the PRU alert signal includes information regarding the time period.

25. The wireless power transmitter of claim 24, wherein the information regarding the time period includes bits for indicating the time period.

26. The wireless power transmitter of claim 25, wherein the bits for indicating the time period are one of a first value, a second value, a third value, or a fourth value.

27. The wireless power transmitter of claim 23, wherein the message notifies the wireless power transmitter that no communication between the wireless power transmitter and the wireless power receiver is possible for the time period.

28. The wireless power transmitter of claim 23, wherein the controller is further configured to:
    maintain controlling the wireless power transmitter to transmit the second power for the time period required to complete the procedure for re-initializing the communication connection, starting from a time point at which the message is received.

* * * * *